(12) United States Patent
Niizuma

(10) Patent No.: US 11,075,526 B2
(45) Date of Patent: Jul. 27, 2021

(54) CHARGING CONTROL DEVICE

(71) Applicant: IHI Corporation, Tokyo (JP)

(72) Inventor: Motonao Niizuma, Koto-ku (JP)

(73) Assignee: IHI CORPORATION, Tokyo (JP)

( * ) Notice: Subject to any disclaimer, the term of this patent is extended or adjusted under 35 U.S.C. 154(b) by 481 days.

(21) Appl. No.: 15/772,293

(22) PCT Filed: Oct. 14, 2016

(86) PCT No.: PCT/JP2016/080559
§ 371 (c)(1),
(2) Date: Apr. 30, 2018

(87) PCT Pub. No.: WO2017/077838
PCT Pub. Date: May 11, 2017

(65) Prior Publication Data
US 2018/0316198 A1 Nov. 1, 2018

(30) Foreign Application Priority Data
Nov. 6, 2015 (JP) .............................. JP2015-218505

(51) Int. Cl.
*H02J 7/00* (2006.01)
*H02J 7/02* (2016.01)
(52) U.S. Cl.
CPC .............. *H02J 7/0024* (2013.01); *H02J 7/00* (2013.01); *H02J 7/007* (2013.01); *H02J 7/02* (2013.01)
(58) Field of Classification Search
CPC ...................................................... H02J 7/0024
(Continued)

(56) References Cited
U.S. PATENT DOCUMENTS 6,317,343 B1 * 11/2001 Okamura ................ H02M 3/07
307/109
6,323,623 B1 * 11/2001 Someya ................ H02J 7/0021
320/121

(Continued)

FOREIGN PATENT DOCUMENTS

JP      09-252528 A      9/1997
JP      2001-128379 A    5/2001

(Continued)

OTHER PUBLICATIONS

Otaka, S., et al., "Kilowatt-Class Wireless Power Transfer/Transmission System for Contactless Charging," Toshiba Review, 2013, vol. 68, No. 7, pp. 6-10.

*Primary Examiner* — Jerry D Robbins
(74) *Attorney, Agent, or Firm* — Volpe Koenig

(57) ABSTRACT

A charging control device includes a switching unit configured to be capable of switching a connection state of a battery unit including a plurality of battery modules whose number is N×M; and a controller configured to control the switching unit, wherein the controller causes the switching unit to switch the connection state from a first state in which all the battery modules are connected in series to a second state in which N groups each including M battery modules connected in series are connected in parallel when a power storage amount of the battery unit becomes equal to or larger than a first connection switching value in a first charging method in which a current supplied to each of the plurality of battery modules decreases as the power storage amount increases.

13 Claims, 11 Drawing Sheets

(58) Field of Classification Search
USPC .......................................................... 320/117
See application file for complete search history.

(56) References Cited

U.S. PATENT DOCUMENTS

| | | | | |
|---|---|---|---|---|
| 7,705,560 B2* | 4/2010 | Johnson | ............ | H01M 10/4207 |
| | | | | 320/117 |
| 7,898,223 B2* | 3/2011 | Takeda | .................... | H02M 3/07 |
| | | | | 320/166 |
| 9,601,268 B2* | 3/2017 | Kapoor | .................. | H02J 50/80 |
| 2003/0128013 A1* | 7/2003 | Okamura | ............. | H02J 7/0016 |
| | | | | 320/166 |
| 2012/0319646 A1 | 12/2012 | Kamata | | |
| 2015/0311744 A1 | 10/2015 | Kamata | | |

FOREIGN PATENT DOCUMENTS

| | | | |
|---|---|---|---|
| JP | 2003-111286 A | 4/2003 | |
| JP | 2008-278635 A | 11/2008 | |
| JP | 2013-021906 A | 1/2013 | |
| JP | 2013-081316 A | 5/2013 | |
| JP | 2015-018707 A | 1/2015 | |

* cited by examiner

*Fig.2*

|  | CONNECTION PATTERN P11 | CONNECTION PATTERN P12 |
|---|---|---|
| SWITCH SW11 | CLOSE | OPEN |
| SWITCH SW12 | OPEN | CLOSE |
| SWITCH SW13 | OPEN | CLOSE |

Fig.5
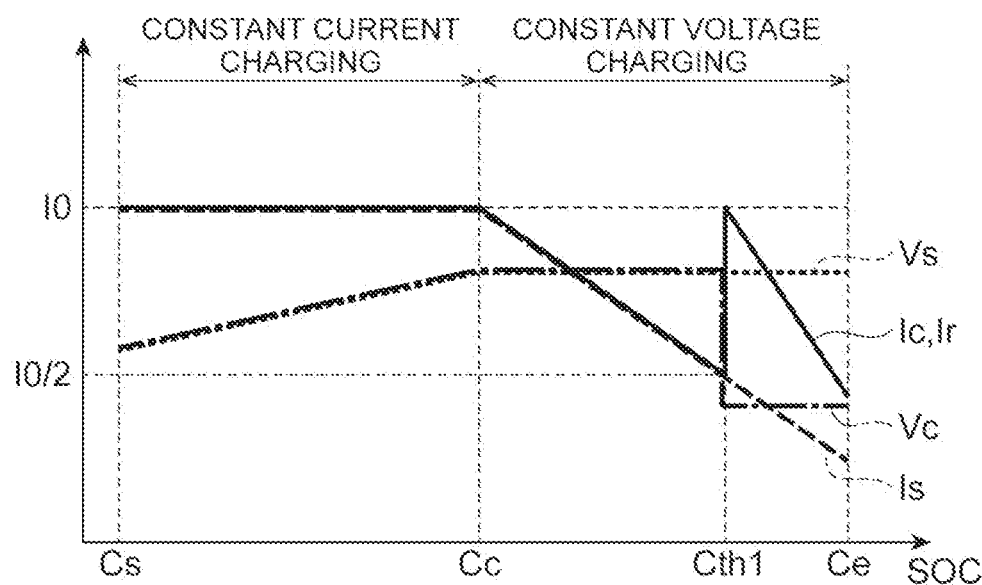
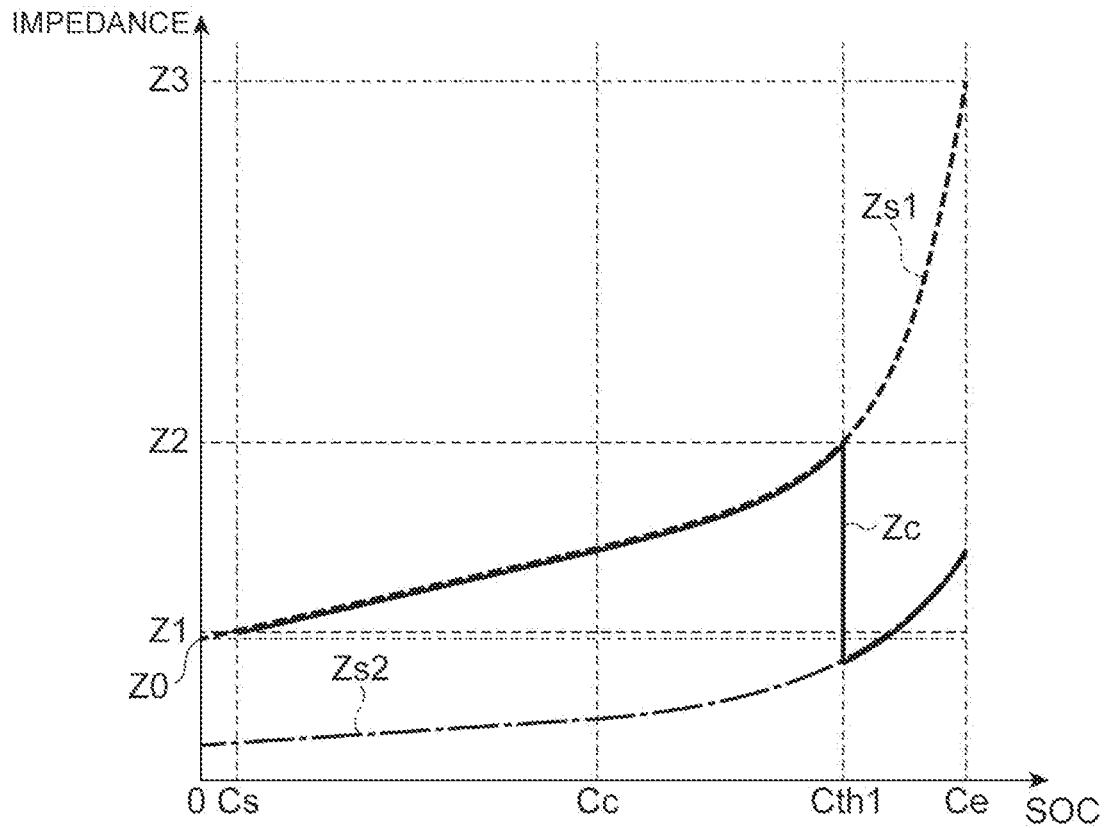

Fig.7

|  | CONNECTION PATTERN P21 | CONNECTION PATTERN P22 | CONNECTION PATTERN P23 |
|---|---|---|---|
| SWITCH SW11 | CLOSE | OPEN | OPEN |
| SWITCH SW12 | OPEN | CLOSE | CLOSE |
| SWITCH SW13 | OPEN | CLOSE | CLOSE |
| SWITCH SW21 | CLOSE | CLOSE | OPEN |
| SWITCH SW22 | OPEN | OPEN | CLOSE |
| SWITCH SW23 | OPEN | OPEN | CLOSE |
| SWITCH SW31 | CLOSE | CLOSE | OPEN |
| SWITCH SW32 | OPEN | OPEN | CLOSE |
| SWITCH SW33 | OPEN | OPEN | CLOSE |

*Fig.9*
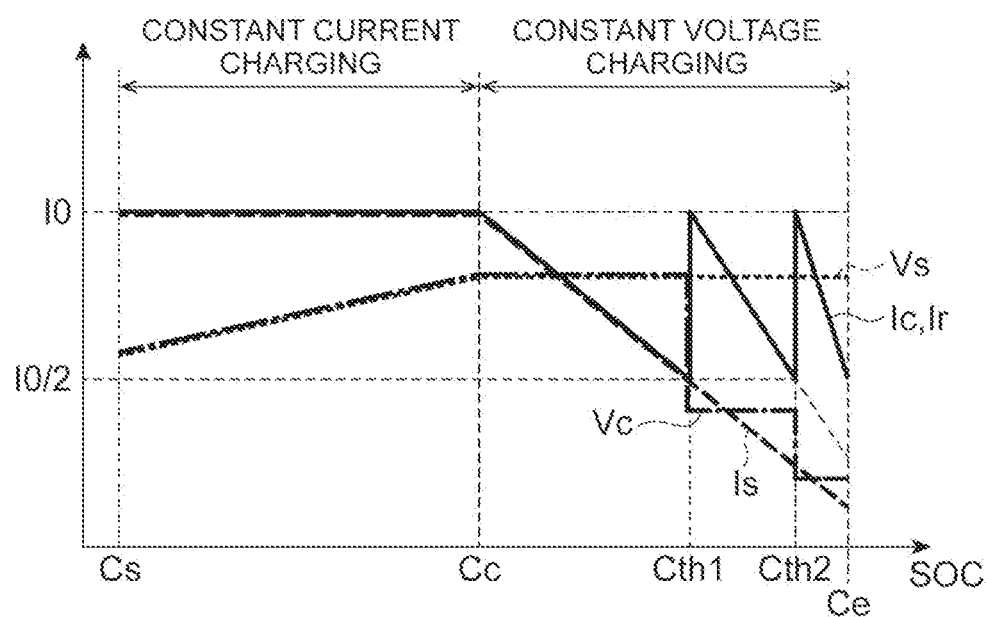
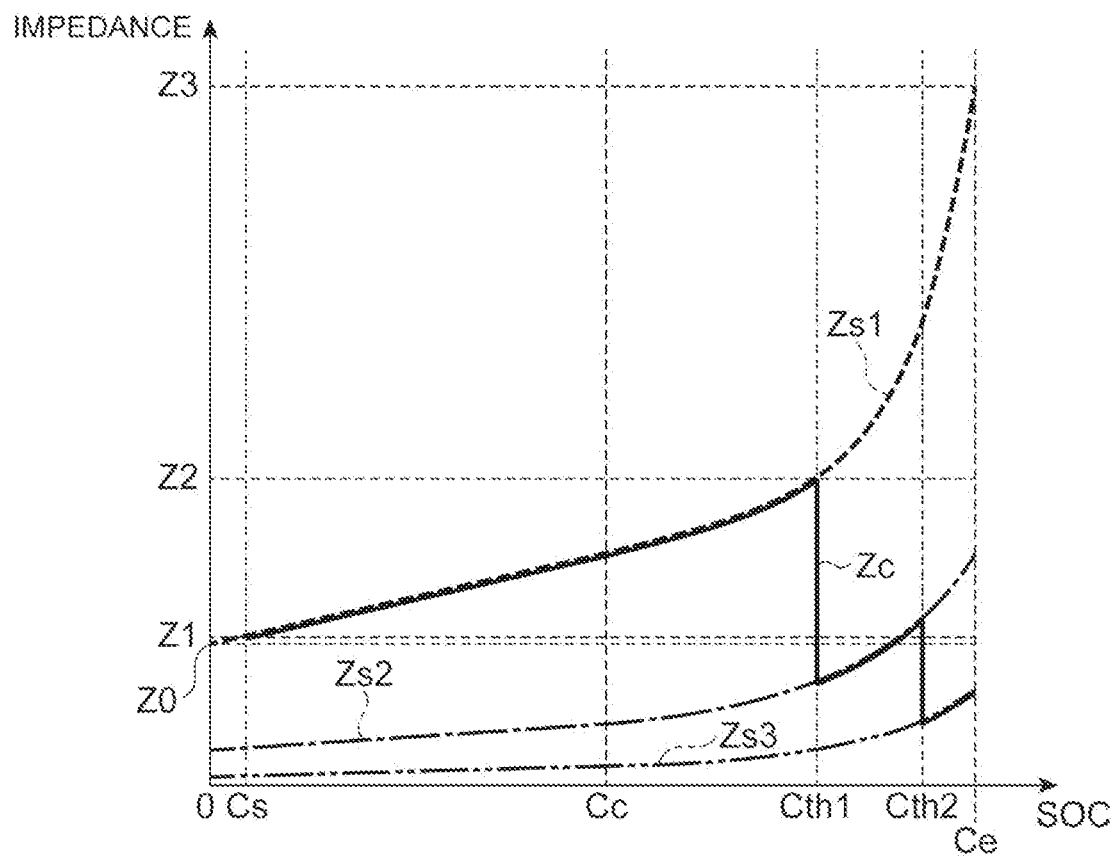

Fig.11
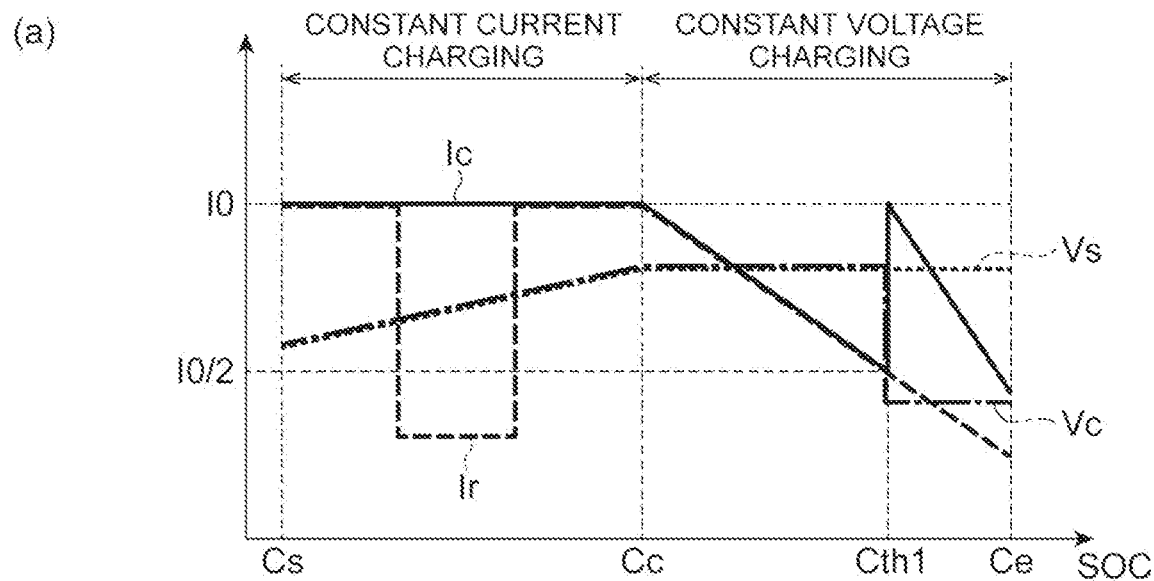
(a)
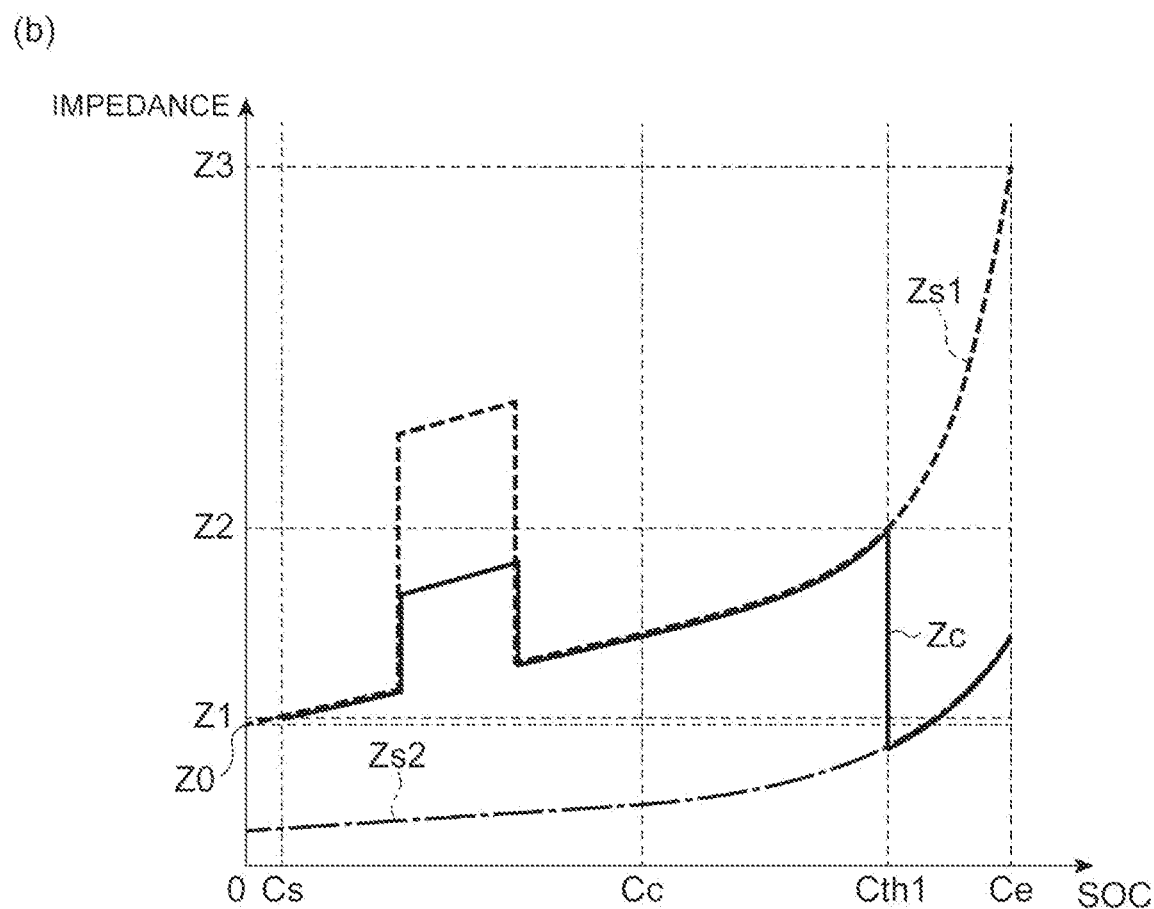
(b)

CHARGING CONTROL DEVICE

TECHNICAL FIELD

The present disclosure relates to a charging control device.

BACKGROUND ART

A system for charging a rechargeable secondary battery such as a battery is known. For example, Non Patent Literature 1 describes a wireless charging system in which electric power is transmitted from a coil (power transmission coil) in a power transmission pad to a coil (power reception coil) in a power reception pad using a magnetic field resonance method.

CITATION LIST

Non Patent Literature

Non Patent Literature 1: Shoji Otaka, and Hiroshi Mochikawa, "kW-class Wireless Power Transmission System", Toshiba Review, 2013, Vol. 68, No. 7, p. 6-10.

SUMMARY

Technical Problem

Meanwhile, in a case where charging the secondary battery, when the state of charge (SOC), which is the power storage amount of the secondary battery, is small, that is, when the charge amount of the secondary battery is small, the constant current charging may be performed, and in a state where the SOC of the secondary battery is large, that is, in a state where the secondary battery is close to full charge, constant voltage charging may be performed. While charging the secondary battery, the voltage (charging voltage) and the current (charging current) of the secondary battery change according to the SOC. Therefore, the impedance of the secondary battery also changes according to the SOC. In particular, in constant voltage charging, since the current decreases as the SOC increases, the impedance of the secondary battery greatly changes and becomes very large at near the full charge level.

For example, in the wireless charging system described in Non Patent Literature 1, since the magnetic coupling between the power transmission coil and the power reception coil is utilized, the transmission efficiency lowers when the impedance of the secondary battery fluctuates. As described above, an increase in the impedance of the secondary battery may lower the charging efficiency such as the transmission efficiency. In the present technical field, a charging control device capable of suppressing reduction in charging efficiency is desired.

Solution to Problem

A charging control device according one aspect of the present disclosure includes a switching unit configured to be capable of switching a connection state of a battery unit including a plurality of battery modules whose number is N×M (where N is an integer of 2 or more, and M is an integer of 1 or more), and a controller configured to control the switching unit so as to cause the switching unit to switch the connection state based on a power storage amount of the battery unit. The switching unit is configured to be capable of switching the connection state between a first state in which all the battery modules are connected in series, and a second state in which N groups each including M battery modules connected in series are connected in parallel. The controller causes the switching unit to switch the connection state from the first state to the second state when the power storage amount becomes equal to or larger than a first connection switching value in a first charging method in which a current supplied to each of the plurality of battery modules decreases as the power storage amount increases.

Advantageous Effects

According to each aspect and various embodiments of the present disclosure, reduction in charging efficiency can be suppressed.

BRIEF DESCRIPTION OF DRAWINGS

FIG. 2 is a diagram showing a connection pattern of the switching unit of FIG. 1.

FIGS. 5(a) and 5(b) are diagrams for explaining changes in charging current, charging voltage, and impedance according to the method of controlling charging of the charging control device of FIG. 1.

FIG. 7 is a diagram showing a connection pattern of the switching unit of FIG. 6.

FIGS. 9(a) and 9(b) are diagrams for explaining changes in charging current, charging voltage, and impedance according to the method of controlling charging of the charging control device of FIG. 6.

FIGS. 11(a) and 11(b) are diagrams for explaining changes in charging current, charging voltage, and impedance according to the method of controlling charging of the charging control device of FIG. 10.

DESCRIPTION OF EMBODIMENTS

Figure 1:
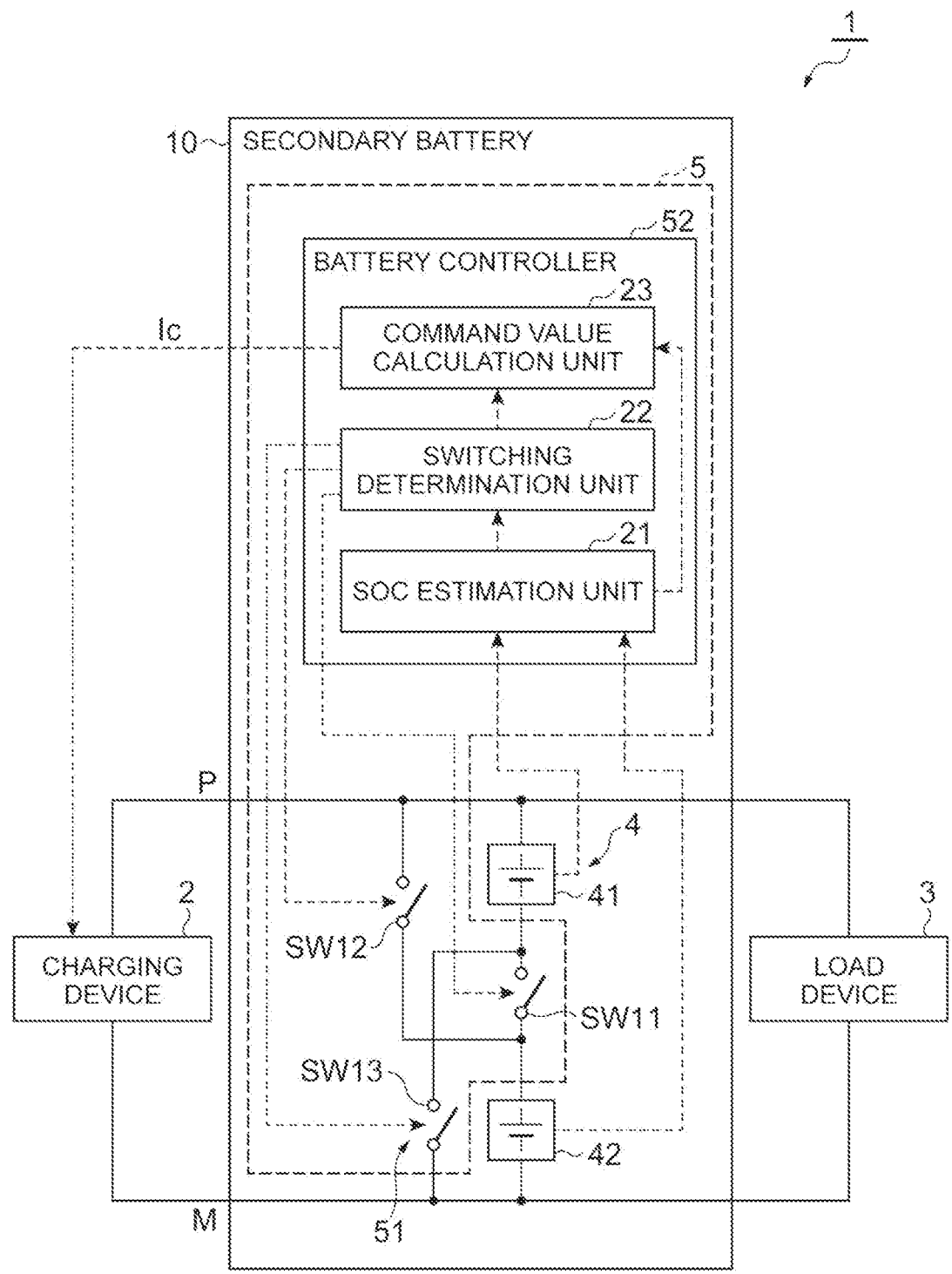
FIG. 1 is a diagram showing a schematic configuration of a power feeding system including a charging control device according to a first embodiment.

Since the embodiments according to the present disclosure described below are merely examples for explaining the present invention, the present invention should not be limited to the following content.

[1] Outline of Embodiment

A charging control device according one aspect of the present disclosure includes a switching unit configured to be capable of switching a connection state of a battery unit including a plurality of battery modules whose number is N×M (where N is an integer of 2 or more, and M is an integer of 1 or more), and a controller configured to control the switching unit so as to cause the switching unit to switch the connection state based on a power storage amount of the battery unit. The switching unit is configured to be capable of switching the connection state between a first state in which all the battery modules are connected in series, and a second state in which N groups each including M battery modules connected in series are connected in parallel. The controller causes the switching unit to switch the connection state from the first state to the second state when the power storage amount becomes equal to or larger than a first connection switching value in a first charging method in which a current supplied to each of the plurality of battery modules decreases as the power storage amount increases.

Since the impedance is inversely proportional to the current in a case where the battery unit is charged by the first charging method in which the value of the current supplied to each of the plurality of battery modules decreases as the power storage amount of the battery unit increases, the impedance of the battery unit increases as the power storage amount of the battery unit increases. In this charging control device, in a case where the battery unit is charged by the first charging method, when the power storage amount becomes equal to or larger than the predetermined first connection switching value, the connection state of the battery unit is switched from the first state in which all the battery modules are connected in series to the second state in which N groups each including M battery modules connected in series are connected in parallel. As a result, the voltage value of the voltage of the battery unit in the second state is 1/N of the voltage value of the voltage of the battery unit in the first state before and after the connection state of the battery unit switches. Since the impedance is proportional to the voltage, the impedance of the battery unit can be reduced. Therefore, compared with a case of charging in the first state without the connection state of the battery unit being switched, the maximum value of the impedance during charging can be reduced. As a result, reduction in charging efficiency can be suppressed.

The controller may transmit a current command value instructing a value of the charging current supplied to the battery unit to the charging device that supplies the charging current based on the power storage amount and the connection state. It is desirable that the current command value of the charging current to be supplied to the battery module be changed in accordance with the power storage amount of the battery unit (battery module). In addition, in the first state, since all the battery modules are connected in series, the value of the charging current supplied from the charging device is supplied to each battery module. On the other hand, in the second state, since N groups each including M battery modules connected in series are connected in parallel, 1/N of the value of the charging current supplied from the charging device is supplied to each battery module. Therefore, transmitting the current command value to the charging device based on the power storage amount and the connection state makes it possible to receive the charging current corresponding to the power storage amount and the connection state of the battery unit.

The controller may have a characteristic table in which the power storage amount is associated with the module charging current value which is the value of the current to be supplied to one battery module. When the connection state is the first state, the controller may transmit the module charging current value associated with the power storage amount as the current command value to the charging device. When the connection state is the second state, the controller may transmit the value that is N times as large as the module charging current value associated with the power storage amount as a current command value to the charging device. In the first state, since all the battery modules are connected in series, the value of the charging current supplied from the charging device is supplied to each battery module. On the other hand, in the second state, since N groups including M battery modules connected in series are connected in parallel, 1/N of the value of the charging current supplied from the charging device is supplied to each battery module. For this reason, by transmitting the module charging current value associated with the power storage amount as a current command value to the charging device in a case where the connection state of the battery unit is the first state, and transmitting the value that is N times as large as the module charging current value associated with the power storage amount as a current command value to the charging device in a case where the connection state of the battery unit is the second state, it is possible to make the value of the charging current supplied to each battery module coincident with the module charging current value, which is the value of the current to be supplied to one battery module, regardless of the connection state of the battery unit. In this case, before and after the connection state of the battery unit is switched, the value of the charging current supplied to the battery unit in the second state is N times as large as the value of the charging current supplied to the battery unit in the first state. Therefore, it is possible to further reduce the impedance of the battery unit. For this reason, compared with the case of charging in the first state without the connection state of the battery unit being switched, the maximum value of the impedance during charging can be reduced. As a result, reduction in charging efficiency can be suppressed.

The controller may transmit the current command value to the charging device so as to charge the battery unit by a second charging method in which the value of the current supplied to each of the plurality of battery modules is made constant in a case where the power storage amount is smaller than a charge switching value, and the controller may transmit the current command value to the charging device so as to charge the battery unit by the first charging method in a case where the power storage amount is equal to or larger than the charge switching value. As described above, even in a case where the charging method is switched in accordance with the power storage amount of the battery unit, the maximum value of the impedance during charging can be reduced, thereby making it possible to suppress the lowering of the charging efficiency.

The first connection switching value may be the power storage amount in which the current command value in the second state is equal to or less than the value of the charging current in the second charging method. For example, in a case where the connection state of the battery unit is the second state, even if a value that is N times as large as the module charging current value associated with the power storage amount is transmitted to the charging device as the current command value, since this current command value is equal to or less than the value of the charging current in the second charging method, there is no need to increase the maximum value (current capacity) of the value of the charging current that can be supplied by the charging device. This makes it possible to receive a desired charging current without changing the maximum value (current capacity) of electric current that can be output by the charging device.

The first connection switching value may be the power storage amount in which the impedance of the battery unit when the connection state is switched from the first state to the second state falls within the range of the impedance of the battery unit when charging the battery unit by the second charging method. The charging device may be designed to have high charging efficiency within the range of the impedance of the battery unit when charging the battery unit by the second charging method. Therefore, it is possible to lengthen the period during which charging is performed in the range of the impedance with high charging efficiency, and to improve the charging efficiency.

In a case where the connection state is the first state, the controller may cause the switching unit to switch the connection state from the first state to the second state in response to receiving a switching command for lowering the impedance of the battery unit from the charging device. The value of the charging current that the charging device can supply to the battery unit may become smaller than the current command value. In such a case, the charging device transmits the switching command for lowering the impedance of the battery unit to the charging control device, and whereby the connection state of the battery unit can be switched from the first state to the second state. This makes it possible to reduce the impedance of the battery unit and to prevent the impedance of the battery unit as much as possible from exceeding the upper limit of the impedance that can be output by the charging device.

M may be $N1 \times M1$ (where N1 is an integer of 2 or more, and M1 is an integer of 1 or more). The switching unit may be further capable of switching the connection state to a third state in which $N \times N1$ groups each including M1 battery modules connected in series are connected in parallel. When the battery unit is charged by the first charging method, the controller may cause the switching unit to switch the connection state of the battery unit from the second state to the third state in response to the power storage amount becoming equal to or larger than a second connection switching value which is larger than the first connection switching value. As described above, in a case where charging the battery unit by the first charging method, the impedance of the battery unit increases as the power storage amount of the battery unit increases. In this configuration, in a case where the battery unit is charged by the first charging method, the connection state of the battery unit is switched from the second state to the third state in which $N \times N1$ groups each including M1 battery modules connected in series are connected in parallel in response to the power storage amount becoming equal to or larger than the second connection switching value. As a result, the voltage value of the voltage of the battery unit in the third state is 1/N1 of the voltage value of the voltage of the battery unit in the second state before and after the connection state of the battery unit is switched. For this reason, it is possible to further reduce the impedance of the battery unit. Therefore, compared with a case of charging in the first state without the connection state of the battery unit being switched, the maximum value of the impedance during charging can be reduced. As a result, reduction in charging efficiency can be suppressed.

[2] Description of Embodiments

Hereinafter, embodiments of the present disclosure will be described with reference to the drawings. Note that in the description of the drawings, the same elements are denoted by the same reference numerals, and duplicate explanation is omitted.

First Embodiment

FIG. 1 is a diagram showing a schematic configuration of a power feeding system including a charging control device according to a first embodiment. As shown in FIG. 1, the power feeding system 1 includes a charging device 2, a load device 3, and a secondary battery 10. The secondary battery 10 includes a battery unit 4 and a charging control device 5. The power feeding system 1 charges the secondary battery 10 by receiving power from the charging device 2 when charging the secondary battery 10 (battery unit 4), and supplies the electric power accumulated in the secondary battery 10 to the load device 3 when discharging the secondary battery 10. In the example of a movable object such as an electric vehicle, the load device 3 is an electric motor and an inverter for driving the movable object, one part of the charging device 2 is installed on a fixing side such as on the ground, and the other part of the charging device 2, the secondary battery 10, and load device 3 are mounted on the movable object. In addition, in the example of a portable device, the load device 3 is the portable device itself, one part of the charging device 2 is installed on a desk, for example, and the other part of the charging device 2, the secondary battery 10 and the load device 3 are mounted on the portable device.

The charging device 2 is a device capable of supplying electric power. The charging device 2 is, for example, a wireless power transfer type charging device including a power transmitter and a power receiver. In this case, the charging device 2 is configured to supply electric power by using inter-coil magnetic coupling such as a magnetic field resonance method and an electromagnetic induction method. The charging device 2 supplies a charging current to the secondary battery 10 according to a current command value Ic transmitted from the charging control device 5. The current command value Ic is transmitted from the charging control device 5 to the charging device 2. The current command value Ic is a value for instructing a value Ir (see FIG. 5($a$)) of the charging current supplied from the charging device 2 to the secondary battery 10. A positive electrode terminal P of the secondary battery 10 is connected to the positive electrode terminal of the charging device 2 and the positive electrode terminal of the load device 3. A negative electrode terminal M of the secondary battery 10 is connected to the negative electrode terminal of the charging device 2 and the negative electrode terminal of the load device 3.

The battery unit 4 is capable of charging and discharging electric power, and includes a plurality of battery modules whose number is $N \times M$ (where N is an integer of 2 or more, M is an integer of 1 or more). The battery module is a battery constituting the battery unit 4. Examples of the battery module include a battery cell, a plurality of battery cells connected in series, a plurality of battery cells connected in parallel, and a plurality of battery cells connected in series and parallel. The battery cell is, for example, a lithium ion battery or the like. The plurality of battery modules have substantially the same charge/discharge characteristics. The charge/discharge characteristics of the plurality of battery modules practically have a variation. This variation is such that there is no practical problem with the power feeding system 1. In the example shown in FIG. 1, N=2 and M=1. That is, the battery unit 4 includes a battery module 41 and a battery module 42. The positive electrode terminal of the battery module 41 is connected to the positive electrode terminal P of the secondary battery 10, and the negative electrode terminal of the battery module 42 is connected to the negative electrode terminal M of the secondary battery 10.

The charging control device 5 transmits and receives to/from the charging device 2 information necessary for charging the battery unit 4. As will be described later, the charging control device 5 generates the current command value Ic so as to charge the battery unit 4 by switching the constant current charging method (the second charging method) and the constant voltage charging method (the first charging method) according to the SOC (the power storage amount) of the battery unit 4, to control the inside of the secondary battery 10. The SOC is a value representing the state of charge of the battery unit 4 (each battery module), and the state of the battery unit 4 being fully charged is represented as 100%, and the state of the battery unit 4 being completely discharged is represented as 0%. Note that the SOC of each battery module of the battery unit 4 is substantially the same, and the SOC of the battery unit 4 is determined as, for example, the average value, the maximum value, or the minimum value of the SOC of each battery module. The constant current charging method is a charging method in which the value of the charging current supplied to each battery module is made constant. In the constant current charging method, the charging voltage of the battery module gradually increases as the SOC of the battery module increases. The constant voltage charging method is a charging method in which the voltage value of the charging voltage of each battery module is made constant. In the constant voltage charging method, the charging current of the battery module decreases as the SOC of the battery module increases. The charging control device 5 includes a switching unit 51 and a battery controller 52 (control unit).

The switching unit 51 is configured to be capable of switching the connection state of the battery unit 4. In the first embodiment, the switching unit 51 is configured to be capable of switching the connection state of the battery unit 4 between the first state and the second state. In the example shown in FIG. 1, the first state is a state in which the battery module 41 and the battery module 42 are connected in series. The second state is a state in which the battery module 41 and the battery module 42 are connected in parallel. The switching unit 51 includes a switch SW11, a switch SW12, and a switch SW13.

Each of the switches SW11, SW12, and SW13 is an element capable of switching electrical opening and closing. That is, the state is switched between an open state in which the ends of each switch are electrically isolated from each other and a closed state in which the ends of each switch are electrically connected each other. Examples of the switches SW11, SW12, and SW13 include a semiconductor switch and a mechanical relay. Each of the switches SW11, SW12, and SW13 switches the connection state between the open state and the closed state in accordance with the switching signal output from the battery controller 52.

One end of the switch SW11 is connected to the negative electrode terminal of the battery module 41, and the other end of the switch SW11 is connected to the positive electrode terminal of the battery module 42. One end of the switch SW12 is connected to the positive electrode terminal P of the secondary battery 10 and the other end of the switch SW12 is connected to the positive electrode terminal of the battery module 42. One end of the switch SW13 is connected to the negative electrode terminal of the battery module 41 and the other end of the switch SW13 is connected to the negative electrode terminal M of the secondary battery 10.

In accordance with the SOC of the battery unit 4, the battery controller 52 transmits the current command value Ic to the charging device 2 and switches the connection pattern of the switching unit 51. The battery controller 52 includes an SOC estimation unit 21, a switching determination unit 22, and a command value calculation unit 23.

The SOC estimation unit 21 functions as an SOC estimation means that estimates the SOC of the battery unit 4. The SOC estimation unit 21 estimates the SOC by a known means. For example, the SOC estimation unit 21 calculates the electric charge quantity supplied to the battery modules 41 and 42 by integrating the value of the current supplied to the battery modules 41 and 42, and estimates the SOC of the battery modules 41 and 42, that is, the SOC of the battery unit 4, from the calculated electric charge quantity. The value of the current supplied to the battery modules 41 and 42 is measured by a current sensor based on a contactless method of measuring a magnetic field generated around the electric wire in association with an electric current, and a method of measuring a potential difference occurring at both ends of a resistance element by inserting the resistance element into the circuit and applying current, or the like, and is output to the SOC estimation unit 21. The SOC estimation unit 21 outputs the estimated SOC to the switching determination unit 22 and the command value calculation unit 23.

The switching determination unit 22 functions as a switching determination means that controls the switching unit 51 so as to switch the connection state of the battery unit 4 on the basis of the SOC of the battery unit 4. During charging of the battery unit 4, the switching determination unit 22 outputs the switching signal to the switching unit 51 so that the connection state of the battery unit 4 is set to the first state in a case where the SOC of the battery unit 4 is in the range of 0% or more, and less than a connection switching value Cth1 (first connection switching value). During charging of the battery unit 4, the switching determination unit 22 outputs the switching signal to the switching unit 51 so that the connection state of the battery unit 4 is set to the second state in a case where the SOC of the battery unit 4 is in the range of the connection switching value Cth1 or more, and 100% or less. During discharging of the battery unit 4, the switching determination unit 22 outputs the switching signal to the switching unit 51 so that the connection state of the battery unit 4 is set to the first state. The switching determination unit 22 outputs status information indicating the connection state of the battery unit 4 to the command value calculation unit 23.

Here, the connection switching value Cth1 is larger than or equal to a charge switching value Cc and less than 100%. The charge switching value Cc is an SOC in which the charging method is switched from the constant current charging method to the constant voltage charging method. That is, when the switching determination unit 22 charges the battery unit 4 by the constant voltage charging method, the switching determination unit 22 outputs the switching signal to the switching unit 51 so as to switch the connection state of the battery unit 4 from the first state to the second state. The connection switching value Cth1 may be, for example, an SOC in which the current command value Ic in a case where the connection state of the battery unit 4 is the second state is equal to or less than a value I0 of the charging current in the constant current charging method. In the present embodiment, the connection switching value Cth1 is an SOC in which the current command value Ic immediately before switching the connection state of the battery unit 4 from the first state to the second state is half as large as the value I0 of the charging current in the constant current charging method.

As shown in FIG. 2, the switching determination unit 22 sets the connection pattern of the switching unit 51 to either a connection pattern P11 or a connection pattern P12. The connection pattern P11 is a pattern in which the connection state of the battery unit 4 is set to the first state. The connection pattern P12 is a pattern in which the connection state of the battery unit 4 is set to the second state. When setting the connection pattern of the switching unit 51 to the connection pattern P11, the switching determination unit 22 outputs the switching signal to the switches SW11, SW12, and SW13 so that the switch SW11 is set to the closed state and each of the switches SW12 and SW13 is set to the open state. When setting the connection pattern of the switching unit 51 to the connection pattern P12, the switching determination unit 22 outputs the switching signal to the switches SW11, SW12, and SW13 so that the switch SW11 is set to the open state and each of the switches SW12 and SW13 is set to the closed state.

The command value calculation unit 23 functions as a command value calculation means that calculates the current command value Ic on the basis of the SOC of the battery unit 4 and the connection state of the battery unit 4, and transmits the current command value Ic to the charging device 2. Specifically, the command value calculation unit 23 calculates the current command value Ic according to the SOC of the battery unit 4 estimated by the SOC estimation unit 21, and the status information output from the switching determination unit 22. The command value calculation unit 23 includes a characteristic table in which the SOC and a module charging current value Is are associated with each other. The module charging current value Is is an optimum value of electric current to be supplied to one battery module (the battery module 41 or the battery module 42) according to the SOC of the battery module. The module charging current value Is is determined for each battery module type. As the module charging current value Is, a value suitable for the battery module according to the SOC of the battery module is determined in advance by experimental results or the like. Therefore, the characteristic table is preset in the battery controller 52 according to each battery module type.

On the basis of the characteristic table, the command value calculation unit 23 transmits the current command value Ic to the charging device 2 so as to charge the battery unit 4 by the constant current charging method in a case where the SOC of the battery unit 4 is smaller than the charge switching value Cc, and transmits the current command value Ic to the charging device 2 so as to charge the battery unit 4 by the constant voltage charging method in a case where the SOC of the battery unit 4 is equal to or larger than the charge switching value Cc. Further, in a case where the connection state of the battery unit 4 is the first state, the command value calculation unit 23 transmits the module charging current value Is associated with the SOC in the characteristic table as the current command value Ic to the charging device 2. When the connection state of the battery unit 4 is the second state, the command value calculation unit 23 transmits a value which is twice as large as the module charging current value Is associated with the SOC in the characteristic table as the current command value Ic to the charging device 2.

Figure 3:
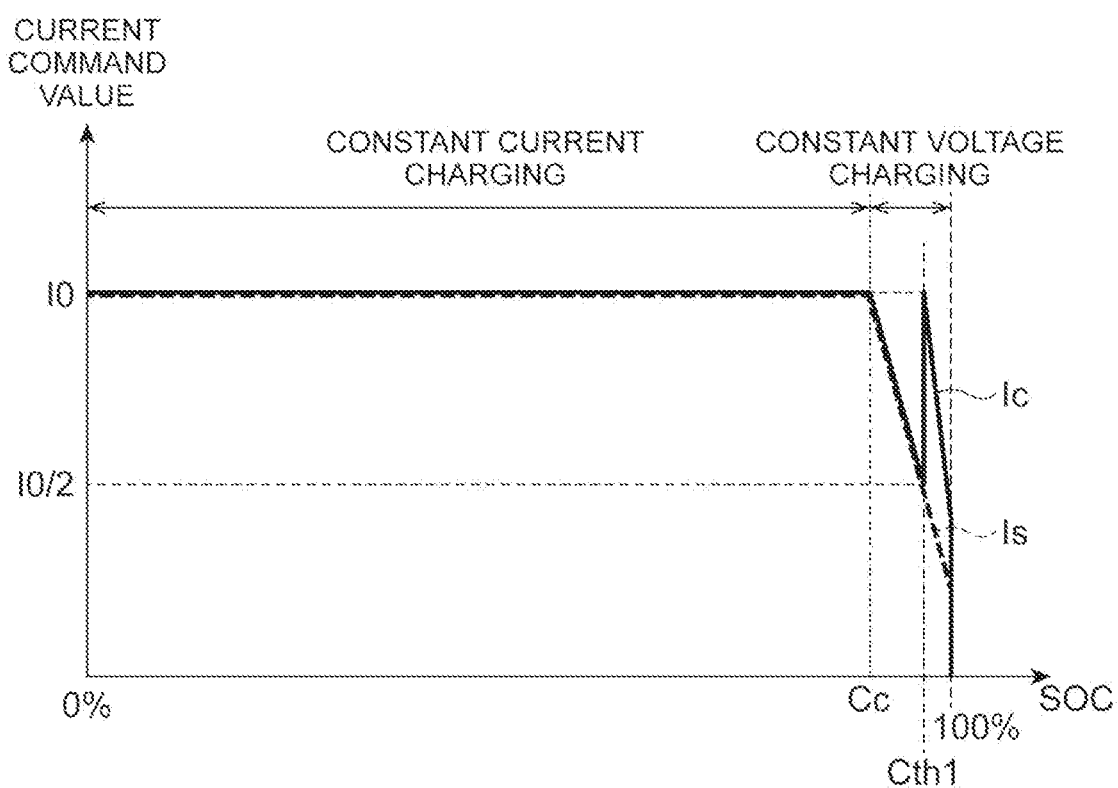
FIG. 3 is a diagram showing an example of the relation between an SOC, the current command value and the module charging current value.

FIG. 3 is a diagram showing an example of the relation between the SOC and the current command value Ic, and the relation between the SOC and the module charging current value Is. As shown in FIG. 3, when the SOC is in the range of 0% to the charge switching value Cc, the battery unit 4 is charged by the constant current charging method, and when the SOC is in the range of the charge switching value Cc to 100%, the battery unit 4 is charged by the constant voltage charging method. Here, a state where the SOC is 100% means a state in which the battery unit 4 is charged to the preset maximum charge amount in the specification, and a state where the SOC is 0% means a state in which the battery unit 4 is charged to the preset minimum charge amount in the specification. The connection switching value Cth1 is an SOC in which electric current value is half as large as the value I0 of the charging current in the constant current charging method. When the SOC becomes equal to or larger than the connection switching value Cth1, the battery module 41 and the battery module 42 are connected in parallel, so that an electric current value which is twice as large as the value Ir of the charging current in a case where the battery module 41 and the battery module 42 are connected in series is required. Therefore, when the SOC is equal to or larger than the connection switching value Cth1, the current command value Ic is twice as large as the module charging current value Is. The command value calculation unit 23 has a characteristic table as shown in FIG. 3 which shows the relation between the SOC and the module charging current value Is.

Figure 4:
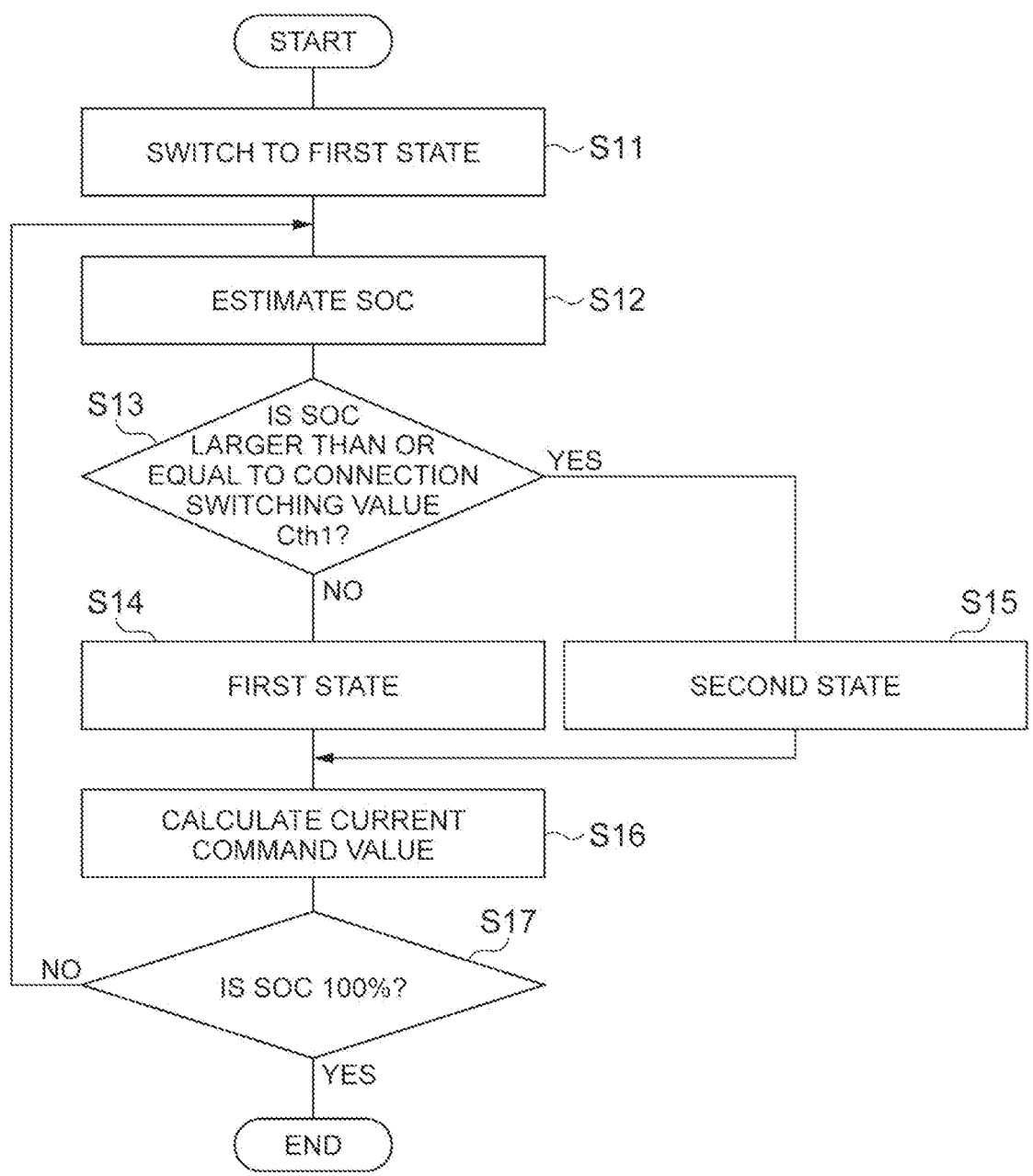
FIG. 4 is a flowchart showing an example of a method of controlling charging of the charging control device of FIG. 1.

Next, an example of a method of controlling charging of the charging control device 5 will be described. FIG. 4 is a flowchart showing the example of the method of controlling charging of the charging control device 5. A series of processing shown in FIG. 4 is started at the timing when charging of the battery unit 4 by the charging device 2 is started.

First, the switching determination unit 22 sets the connection state of the battery unit 4 to the first state, that is, the state in which the battery module 41 and the battery module 42 are connected in series (step S11). Specifically, the switching determination unit 22 outputs the switching signal to the switches SW11, SW12, and SW13 so as to set the connection pattern of the switching unit 51 to the connection pattern P11. When the connection pattern of the switching unit 51 has already been set in the connection pattern P11 (for example, after the discharge of the battery unit 4), the step S11 can be omitted. Then, the SOC estimation unit 21 estimates the SOC of the battery unit 4, and outputs the estimated SOC to the switching determination unit 22 and the command value calculation unit 23 (step S12).

Subsequently, the switching determination unit 22 determines whether or not the SOC of the battery unit 4 is larger than or equal to the connection switching value Cth1 (step S13). When it is determined that the SOC of the battery unit 4 is less than the connection switching value Cth1 (No in step S13), the switching determination unit 22 continues to set the connection state of the battery unit 4 to the first state, that is, the connection state in which the battery module 41 and the battery module 42 are connected in series (step S14). Then, the switching determination unit 22 outputs the status information indicating the first state to the command value calculation unit 23.

On the other hand, in a case where it is determined in step S13 that the SOC of the battery unit 4 is larger than or equal to the connection switching value Cth1 (Yes in step S13), the switching determination unit 22 sets the connection state of the battery unit 4 to the second state, that is, the connection state in which the battery module 41 and the battery module 42 are connected in parallel (step S15). Specifically, the switching determination unit 22 outputs the switching signal to the switches SW11, SW12, and SW13 so as to set the connection pattern of the switching unit 51 to the connection pattern P12. Then, the switching determination unit 22 outputs the status information indicating the second state to the command value calculation unit 23.

Subsequently, the command value calculation unit 23 calculates the current command value Ic (step S16). Specifically, the command value calculation unit 23 refers to the characteristic table, and acquires the module charging current value Is associated with the SOC of the battery unit 4. When the status information output from the switching determination unit 22 indicates the first state, the command value calculation unit 23 sets the acquired module charging current value Is as the current command value Ic. When the status information output from the switching determination unit 22 indicates the second state, the command value calculation unit 23 sets a value which is twice as large as the acquired module charging current value Is as the current command value Ic. Then, the command value calculation unit 23 transmits the calculated current command value Ic to the charging device 2.

Then, the command value calculation unit 23 determines whether or not the SOC of the battery unit 4 is 100% (step S17). When it is determined that the SOC of the battery unit 4 is less than 100% (No in step S17), the process returns to step S12 and the processes of steps S12 to S17 are repeated. On the other hand, in a case where it is determined in step S17 that the SOC of the battery unit 4 is 100% (Yes in step S17), it is decided that the charging has ended, so that the current command value Ic is set to zero and a series of processing of the method of controlling charging of the charging control device 5 ends. Thereafter, in order to supply electric power from the secondary battery 10 to the load device 3 (for discharging the secondary battery 10), the switching determination unit 22 may switch the connection state of the battery unit 4 from the second state to the first state.

Next, working effects of the power feeding system 1 and the charging control device 5 will be described. FIGS. 5(a) and 5(b) are diagrams for explaining changes in the current command value Ic, the voltage value Vc and the impedance Zc according to the method of controlling charging of the charging control device 5. FIG. 5(a) shows the changes in the current command value Ic and the voltage value Vc during charging, and FIG. 5(b) shows the change in the impedance Zc of the secondary battery 10 during charging. As shown in FIG. 3, the charging of the battery unit 4 by the constant voltage charging method is performed at the end of the charging. In FIGS. 5(a) and 5(b), to facilitate visualization of the figures for the convenience of explanation, the scales of the horizontal axis for the constant current charging method and the constant voltage charging method differ from each other, and the range of the constant voltage charging method is enlarged in the horizontal direction. Further, it is assumed that the current command value Ic and the value Ir of the charging current supplied from the charging device 2 to the secondary battery 10 are the same.

In FIGS. 5(a) and 5(b), the SOC at the start of the charging is indicated as a starting value Cs, and the SOC at the end of the charging is indicated as an ending value Ce. The ending value Ce is generally 100%. In FIG. 5(a), the voltage value Vc is a voltage value of a voltage (charging voltage) between the positive electrode terminal P and the negative electrode terminal M of the secondary battery 10 (hereinafter referred to as a voltage value of the voltage of the secondary battery 10), and a module voltage value Vs is a voltage value of the voltage (charging voltage) between the positive electrode terminal and the negative electrode terminal of one battery module. The impedance Zc of the secondary battery 10 means the impedance of the secondary battery 10 when viewing from the charging device 2 and is a value obtained by dividing the voltage value Vc by the value Ir of the charging current supplied from the charging device 2 to the secondary battery 10. That is, since Zc=Vc/Ir and Ic=Ir, Zc=Vc/Ic. As described above, the current command value (value of the charging current) Ic in a case where the connection state of the battery unit 4 is set to the first state is equal to the module charging current value Is.

In FIG. 5(b), an impedance Zs1 is the impedance of the secondary battery 10 in a case where the connection state of the battery unit 4 is set to the first state, and an impedance Zs2 is the impedance of the secondary battery 10 in a case where the connection state of the battery unit 4 is set to the second state. The impedance Zs1 is a value obtained by dividing the module voltage value Vs by the module charging current value Is. That is, Zs1=Vs/Is. In addition, Zc=Zs1 in a case where the connection state of the battery unit 4 is the first state, and Zc=Zs2 in a case where the connection state of the battery unit 4 is the second state.

As shown in FIG. 5(a), in a case where the battery unit 4 is charged by the constant current charging method, the value Ir of the charging current supplied from the charging device 2 to the secondary battery 10 is the constant value I0, and the voltage value Vc of the voltage of the secondary battery 10 moderately increases as the SOC increases. Therefore, as shown in FIG. 5(b), in a case where the battery unit 4 is charged by the constant current charging method, the impedance Zc of the secondary battery 10 moderately increases. When the SOC of the battery unit 4 reaches the charge switching value Cc, the charging method is switched from the constant current charging method to the constant voltage charging method.

As shown in FIG. 5(a), in a case where the battery unit 4 is charged by the constant voltage charging method, the voltage value Vc of the voltage of the secondary battery 10 is constant, and the value Ir of the charging current supplied from the charging device 2 to the secondary battery 10 decreases as the SOC increases. Therefore, as shown in FIG. 5(b), in a case where the battery unit 4 is charged by the constant voltage charging method, the impedance Zc of the secondary battery 10 drastically increases.

In a case of charging in the first state without the connection state of the battery unit 4 being switched, since the battery module 41 and the battery module 42 are connected in series, the impedance Zs1 is twice as large as the impedance of one battery module. Therefore, the impedance Zs1 is the value Z1 at the start of the charging and the value Z3 at the end of the charging. In this manner, the impedance Zs1 greatly changes between the start of the charging and the end of the charging.

On the other hand, in a case where the connection state of the battery unit 4 is switched from the first state to the second state in response to the SOC of the battery unit 4 being equal to or larger than the connection switching value Cth1, the battery module 41 and the battery module 42 are connected in parallel. Therefore, the voltage value Vc of the voltage of the secondary battery 10 is half as large as the voltage value Vc of the voltage of the secondary battery 10 immediately before the connection state of the battery unit 4 is switched. The current command value Ic transmitted from the command value calculation unit 23 to the charging device 2 is twice as large as the current command value Ic immediately before the connection state of the battery unit 4 is switched.

As a result, the value Ir of the charging current supplied from the charging device 2 to the secondary battery 10 is also twice as large as the value Ir of the charging current immediately before the connection state of the battery unit 4 is switched. Therefore, the impedance Zc of the secondary battery 10 can be reduced to one fourth before and after the connection state of the battery unit 4 is switched. Thereafter, as the SOC of the battery unit 4 increases, the impedance Zc of the secondary battery 10 increases again. As described above, as the SOC of the battery unit 4 increases while the battery unit 4 is being charged by the constant voltage charging method, the connection state of the battery unit 4 is switched in the order of the first state and the second state wherein the impedance Zc of the secondary battery 10 is twice as large as the impedance of one battery module (when the connection state of the battery unit 4 is the first state) and half as large as the impedance of one battery module (when the connection state of the battery unit 4 is the second state) in this order.

In this case, the maximum value Z2 of the impedance Zc of the secondary battery 10 during the period from the start of the charging to the end of the charging is smaller than the value Z3, as compared with the case where switching of the connection state of the battery unit 4 is not performed, and the range of change in the impedance Zc of the secondary battery 10 becomes narrower. In this way, it is possible to reduce the maximum value and fluctuation of the impedance Zc of the secondary battery 10 during charging. As a result, reduction in charging efficiency can be suppressed.

In addition, the connection switching value Cth1 is an SOC in which the current command value Ic in a case where the connection state of the battery unit 4 is the second state is equal to or less than the value I0 of the charging current in the constant current charging method. Specifically, the connection switching value Cth1 is an SOC associated with the module charging current value Is which is equal to or less than half the value I0 of the current in the characteristic table. For this reason, although a value which is twice as large as the module charging current value Is associated with the SOC in the characteristic table is transmitted to the charging device 2 as the current command value Ic in a case where the connection state of the battery unit 4 is the second state, since this current command value Ic is equal to or less than the value I0 of the charging current in the constant current charging method, there is no need to increase the maximum value (current capacity) of the value Ir of the charging current that can be supplied by the charging device 2. This makes it possible to receive a desired charging current without modifying the charging device 2.

In addition, the connection switching value Cth1 may be an SOC in which the impedance Zc of the secondary battery 10 when the connection state of the battery unit 4 is switched from the first state to the second state falls within the range of the impedance Zc of the secondary battery 10 when the battery unit 4 is charged by the constant current charging method. For example, the connection switching value Cth1 may be an SOC in which the impedance Zc when the connection state of the battery unit 4 is switched from the first state to the second state is the impedance Zc (=Z0) in a case where the SOC is 0%, that is, an SOC in which the impedance Zc (=Z2) immediately before the connection state of the battery unit 4 is switched from the first state to the second state is four times as large as the impedance Zc (=Z0) in a case where the SOC is 0%. The charging device 2 may be designed to have high charging efficiency within the range of the impedance Zc when charging the battery unit 4 by the constant current charging method. Therefore, it is possible to lengthen the period during which charging is performed in the range of the impedance Zc with high charging efficiency, and to improve the charging efficiency.

Second Embodiment

Figure 6:
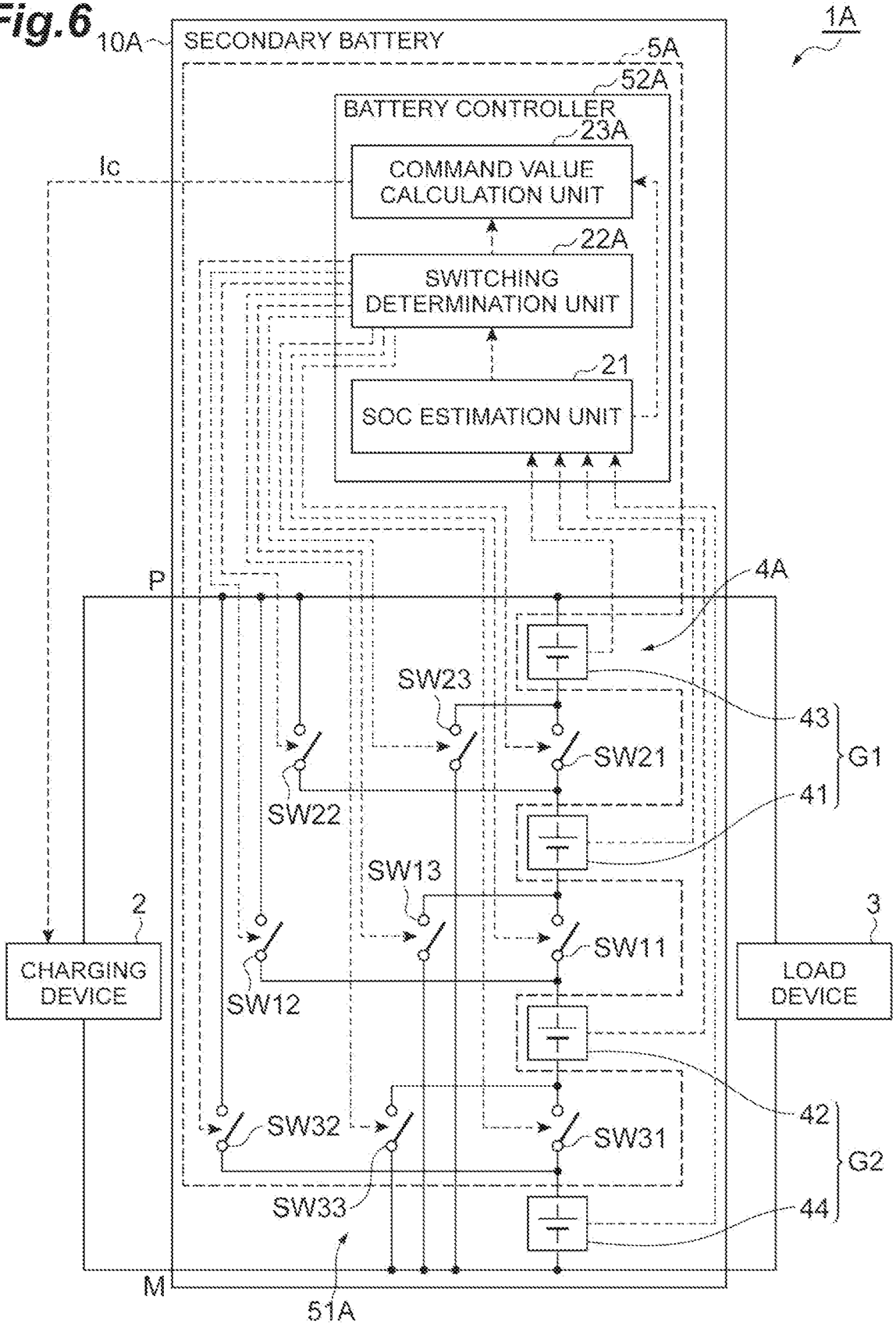
FIG. 6 is a diagram showing a schematic configuration of a power feeding system including a charging control device according to a second embodiment.

FIG. 6 is a diagram showing a schematic configuration of a power feeding system including a charging control device according to a second embodiment. As shown in FIG. 6, the power feeding system 1A is mainly different from the power feeding system 1 in that a secondary battery 10A is provided instead of the secondary battery 10. The secondary battery 10A is different from the secondary battery 10 in that a battery unit 4A and a charging control device 5A are provided instead of the battery unit 4 and the charging control device 5.

The battery unit 4A includes a plurality of battery modules whose number is N×M, and M is N1×M1 (where N1 is an integer of 2 or more, and M1 is an integer of 1 or more). In the second embodiment, N=2, M=2, N1=2, and M1=1. That is, the battery unit 4A is different from the battery unit 4 in that it further includes a battery module 43 and a battery module 44 in addition to the battery module 41 and the battery module 42.

The battery unit 4A includes a group G1 and a group G2. The group G1 includes the battery module 41 and the battery module 43, and the group G2 includes the battery module 42 and the battery module 44. The positive electrode terminal of the battery module 43 is connected to the positive electrode terminal P of the secondary battery 10A, and the negative electrode terminal of the battery module 44 is connected to the negative electrode terminal M of the secondary battery 10A.

The charging control device 5A is different from the charging control device 5 in that it includes a switching unit 51A and a battery controller 52A (control unit) instead of the switching unit 51 and the battery controller 52. The switching unit 51A is different from the switching unit 51 in that it further includes switches SW21, SW22, SW23, SW31, SW32, and SW33 in addition to the switches SW11, SW12, and SW13.

Each of the switches SW21, SW22, SW23, SW31, SW32, and SW33 is an element capable of performing switching of electrical opening and closing as with the switches SW11, SW12, and SW13. Examples of the switches SW21, SW22, SW23, SW31, SW32, and SW33 include a semiconductor switch and a mechanical relay. Each of the switches SW21, SW22, SW23, SW31, SW32, and SW33 switches the connection state between the open state and the closed state in accordance with the switching signal output from the battery controller 52A.

One end of the switch SW21 is connected to the negative electrode terminal of the battery module 43, and the other end of the switch SW21 is connected to the positive electrode terminal of the battery module 41. One end of the switch SW22 is connected to the positive electrode terminal P of the secondary battery 10A and the other end of the switch SW22 is connected to the positive electrode terminal of the battery module 41. One end of the switch SW23 is connected to the negative electrode terminal of the battery module 43 and the other end of the switch SW23 is connected to the negative electrode terminal M of the secondary battery 10A.

One end of the switch SW31 is connected to the negative electrode terminal of the battery module 42, and the other end of the switch SW31 is connected to the positive electrode terminal of the battery module 44. One end of the switch SW32 is connected to the positive electrode terminal P of the secondary battery 10A and the other end of the switch SW32 is connected to the positive electrode terminal of the battery module 44. One end of the switch SW33 is connected to the negative electrode terminal of the battery module 42 and the other end of the switch SW33 is connected to the negative electrode terminal M of the secondary battery 10A.

The battery controller 52A is different from the battery controller 52 in that it includes a switching determination unit 22A and a command value calculation unit 23A instead of the switching determination unit 22 and the command value calculation unit 23. During charging of the battery unit 4A, the switching determination unit 22A outputs the switching signal to the switching unit 51A so that the connection state of the battery unit 4A is set to the first state in which all battery modules are connected in series in a case where the SOC of the battery unit 4A is in the range of 0% or more, and less than the connection switching value Cth1. During charging of the battery unit 4A, the switching determination unit 22A outputs the switching signal to the switching unit 51A so that the connection state of the battery unit 4A is set to the second state in which the group G1 and the group G2 are connected in parallel in a case where the SOC of the battery unit 4A is in the range of the connection switching value Cth1 or more, and less than the connection switching value Cth2 (second connection switching value). At this time, the battery module 41 and the battery module 43 included in the group G1 are connected in series, and the battery module 42 and the battery module 44 included in the group G2 are connected in series. During charging of the battery unit 4A, the switching determination unit 22A outputs the switching signal to the switching unit 51A so that the connection state of the battery unit 4A is set to the third state in which all battery modules are connected in parallel in a case where the SOC of the battery unit 4A is in the range of the connection switching value Cth2 or more, and 100% or less. During discharging of the battery unit 4A, the switching determination unit 22A outputs the switching signal to the switching unit 51A so that the connection state of the battery unit 4A is set to the first state. The switching determination unit 22A outputs the status information indicating the connection state of the battery unit 4A to the command value calculation unit 23A.

Here, the connection switching value Cth2 is larger than the connection switching value Cth1 and less than 100%. That is, the switching determination unit 22A outputs the switching signal to the switching unit 51A so as to switches the connection state of the battery unit 4A from the first state to the second state, and further switches the connection state of the battery unit 4A from the second state to the third state while charging the battery unit 4A by the constant voltage charging method. The connection switching value Cth2 may be, for example, an SOC in which the current command value Ic in a case where the connection state of the battery unit 4A is the third state is equal to or less than the value I0 of the charging current in the constant current charging method. In the present embodiment, the connection switching value Cth2 is an SOC in which the current command value Ic immediately before switching the connection state of the battery unit 4A from the second state to the third state is half as large as the value I0 of the charging current in the constant current charging method.

As shown in FIG. 7, the switching determination unit 22A sets the connection pattern of the switching unit 51A to either connection pattern P21, connection pattern P22, or connection pattern P23. The connection pattern P21 is a pattern in which the connection state of the battery unit 4A is set to the first state. The connection pattern P22 is a pattern in which the connection state of the battery unit 4A is set to the second state. The connection pattern P23 is a pattern in which the connection state of the battery unit 4A is set to the third state. When setting the connection pattern of the switching unit 51A to the connection pattern P21, the switching determination unit 22A outputs the switching signal to each switch so that each of the switches SW11, SW21, and SW31 is set to the closed state and each of the switches SW12, SW13, SW22, SW23, SW32, and SW33 is set to the open state. When setting the connection pattern of the switching unit 51A to the connection pattern P22, the switching determination unit 22A outputs the switching signal to each switch so that each of the switches SW12, SW13, SW21, and SW31 is set to the closed state and each of the switches SW11, SW22, SW23, SW32, and SW33 is set to the open state. When setting the connection pattern of the switching unit 51A to the connection pattern P23, the switching determination unit 22A outputs the switching signal to each switch so that each of the switches SW12, SW13, SW22, SW23, SW32, and SW33 is set to the closed state and each of the switches SW11, SW21, and SW31 is set to the open state.

In addition to the function of the command value calculation unit 23, the command value calculation unit 23A calculates the current command value Ic in a case where the connection state of the battery unit 4A is the third state. Specifically, in a case where the connection state of the battery unit 4A is the third state, the command value calculation unit 23A transmits a value which is four times as large as the module charging current value Is associated with the SOC in the characteristic table as the current command value Ic to the charging device 2.

Figure 8:
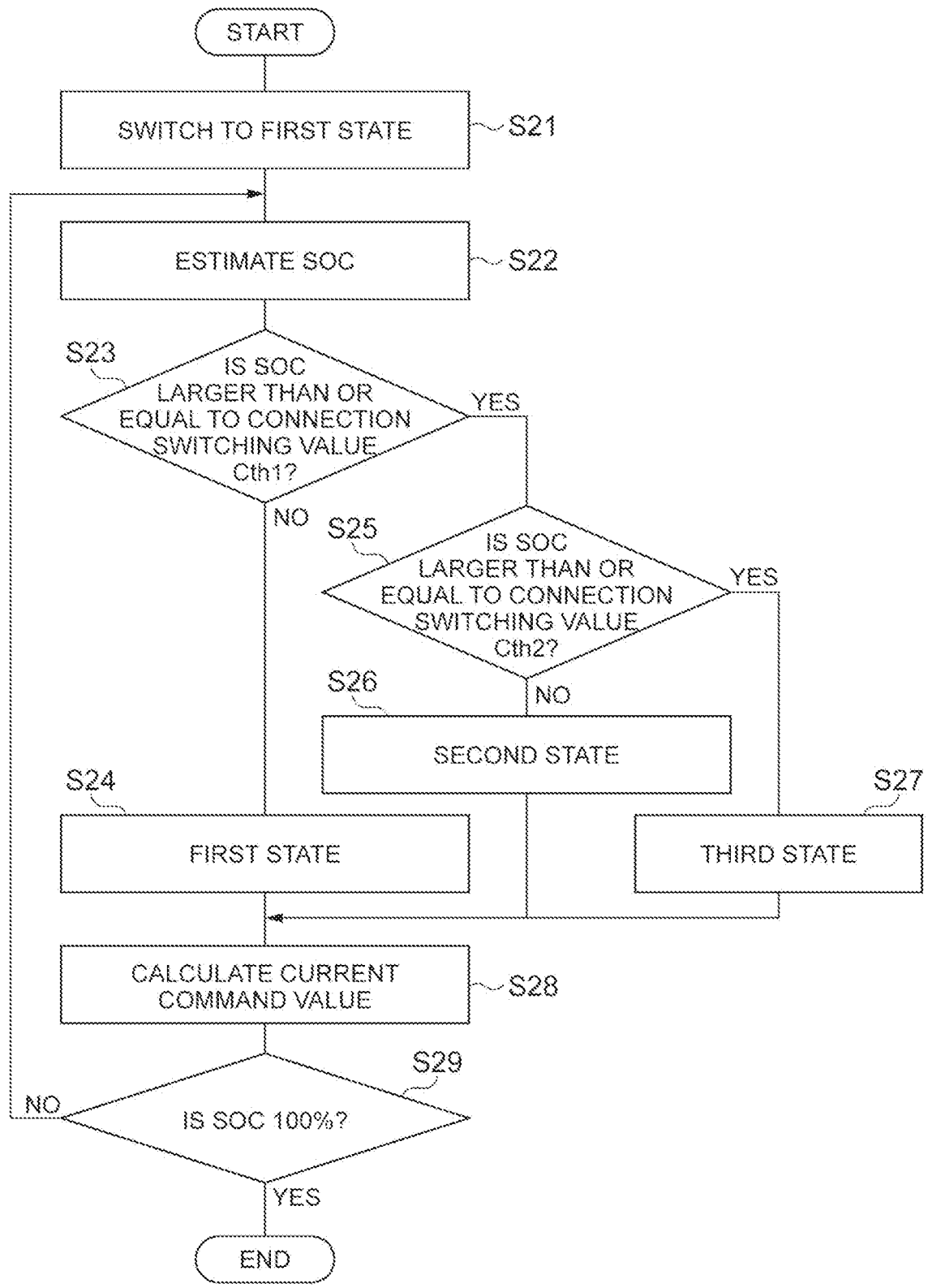
FIG. 8 is a flowchart showing an example of a method of controlling charging of the charging control device of FIG. 6.

Next, an example of a method of controlling charging of the charging control device 5A will be described. FIG. 8 is a flowchart showing an example of the method of controlling charging of the charging control device 5A. A series of processing shown in FIG. 8 is started at the timing when charging of the battery unit 4A by the charging device 2 is started. The processing of steps S21 to S24 is similar to the processing of steps S11 to S14 of FIG. 4, respectively, so that description thereof is omitted.

In a case where it is determined in step S23 that the SOC of the battery unit 4A is larger than or equal to the connection switching value Cth1 (Yes in step S23), the switching determination unit 22A determines whether or not the SOC of the battery unit 4A is larger than or equal to the connection switching value Cth2 (step S25). When it is determined that the SOC of the battery unit 4A is less than the connection switching value Cth2 (No in step S25), the switching determination unit 22A sets the connection state of the battery unit 4A to the second state (step S26). Specifically, the switching determination unit 22A outputs the switching signal to each switch so as to set the connection pattern of the switching unit 51A to the connection pattern P22. Then, the switching determination unit 22A outputs the status information indicating the second state to the command value calculation unit 23A.

On the other hand, in a case where it is determined in step S25 that the SOC of the battery unit 4A is larger than or equal to the connection switching value Cth2 (Yes in step S25), the switching determination unit 22A sets the connection state of the battery unit 4A to the third state, that is, the connection state in which the battery modules 41 to 44 are connected in parallel (step S27). Specifically, the switching determination unit 22A outputs the switching signal to each switch so as to set the connection pattern of the switching unit 51A to the connection pattern P23. Then, the switching determination unit 22A outputs the status information indicating the third state to the command value calculation unit 23A.

Subsequently, the command value calculation unit 23A calculates the current command value Ic (step S28). Specifically, the command value calculation unit 23A refers to the characteristic table, and acquires the module charging current value Is associated with the SOC of the battery unit 4A. When the status information output from the switching determination unit 22A indicates the first state, the command value calculation unit 23A sets the acquired module charging current value Is as the current command value Ic. When the status information output from the switching determination unit 22A indicates the second state, the command value calculation unit 23A sets a value which is twice as large as the acquired module charging current value Is as the current command value Ic. When the status information output from the switching determination unit 22A indicates the third state, the command value calculation unit 23A sets a value which is four times as large as the acquired module charging current value Is as the current command value Ic. Then, the command value calculation unit 23A transmits the calculated current command value Ic to the charging device 2.

Then, the command value calculation unit 23A determines whether or not the SOC of the battery unit 4A is 100% (step S29). When it is determined that the SOC of the battery unit 4A is less than 100% (No in step S29), the process returns to step S22 and the processes of steps S22 to S29 are repeated. On the other hand, in a case where it is determined in step S29 that the SOC of the battery unit 4A is 100% (Yes in step S29), it is decided that the charging has ended, so that the current command value Ic is set to zero and a series of processing of the method of controlling charging of the charging control device 5A ends. Thereafter, the switching determination unit 22A may switch the connection state of the battery unit 4A from the third state to the first state for discharging the secondary battery 10A.

Next, working effects of the power feeding system 1A and the charging control device 5A will be described. FIGS. 9(a) and 9(b) are diagrams for explaining changes in the current command value Ic, the voltage value Vc and the impedance Zc according to the method of controlling charging of the charging control device 5A. FIG. 9(a) shows changes in the current command value Ic and the voltage value Vc during charging, and FIG. 9(b) shows a change in the impedance Zc of the secondary battery 10A during charging. As in FIGS. 5(a) and 5(b), in FIGS. 9(a) and 9(b), to facilitate visualization of the figures for the convenience of explanation, the scales of the horizontal axis for the constant current charging method and the constant voltage charging method differ from each other, and the range of the constant voltage charging method is enlarged in the horizontal direction. Further, it is assumed that the current command value Ic and the value Ir of the charging current supplied from the charging device 2 to the secondary battery 10A are the same.

In FIGS. 9(a) and 9(b), the SOC at the start of the charging is indicated as the starting value Cs, and the SOC at the end of the charging is indicated as the ending value Ce. The ending value Ce is generally 100%. In FIG. 9(a), the voltage value Vc is the voltage value of the charging voltage of the secondary battery 10A, the module voltage value Vs is the voltage value of the voltage (charging voltage) between the positive electrode terminal and the negative electrode terminal of one battery module. Note that the current command value (value of the charging current) Ic in a case where the connection state of the battery unit 4A is set to the first state is equal to the module charging current value Is.

In FIG. 9(b), the impedance Zs1 is the impedance of the secondary battery 10A in a case where the connection state of the battery unit 4A is set to the first state. The impedance Zs2 is the impedance of the secondary battery 10A in a case where the connection state of the battery unit 4A is set to the second state. The impedance Zs3 is the impedance of the secondary battery 10A in a case where the connection state of the battery unit 4A is set to the third state. The impedance Zs1 is a value obtained by dividing the module voltage value Vs by the module charging current value Is. That is, Zs1=Vs/Is. In addition, in a case where the connection state of the battery unit 4A is the first state, Zc=Zs1. When the connection state of the battery unit 4A is the second state, Zc=Zs2. When the connection state of the battery unit 4A is the third state, Zc=Zs3.

In the power feeding system 1A, the connection state of the battery unit 4A is switched from the first state to the second state in response to the SOC of the battery unit 4A becoming equal to or larger than the connection switching value Cth1. As a result, the group G1 and the group G2 are connected in parallel. Therefore, the voltage value Vc of the voltage of the secondary battery 10A is half as large as the voltage value Vc of the voltage of the secondary battery 10A immediately before the connection state of the battery unit 4A is switched from the first state to the second state. The current command value Ic transmitted from the command value calculation unit 23A to the charging device 2 is twice as large as the current command value Ic immediately before the connection state of the battery unit 4A is switched from the first state to the second state.

As a result, the value Ir of the charging current supplied from the charging device 2 to the secondary battery 10A is also twice as large as the value Ir of the charging current immediately before the connection state of the battery unit 4A is switched from the first state to the second state. Therefore, the impedance Zc of the secondary battery 10A can be reduced to one fourth before and after switching the connection state of the battery unit 4A from the first state to the second state. Thereafter, as the SOC of the battery unit 4 increases, the impedance Zc of the secondary battery 10A increases again.

Further, in the power feeding system 1A, the connection state of the battery unit 4A is switched from the second state to the third state in response to the SOC of the battery unit 4A becoming equal to or larger than the connection switching value Cth2. As a result, the battery modules 41 to 44 are connected in parallel. Therefore, the voltage value Vc of the voltage of the secondary battery 10A is half as large as the voltage value Vc of the voltage of the secondary battery 10A immediately before the connection state of the battery unit 4A is switched from the second state to the third state. The current command value Ic transmitted from the command value calculation unit 23A to the charging device 2 is twice as large as the current command value Ic immediately before the connection state of the battery unit 4A is switched from the second state to the third state.

As a result, the value Ir of the charging current supplied from the charging device 2 to the secondary battery 10A is also twice as large as the value Ir of the charging current immediately before switching the connection state of the battery unit 4A from the second state to the third state. Therefore, the impedance Zc of the secondary battery 10A can be reduced to one fourth before and after the connection state of the battery unit 4A is switched from the second state to the third state. As described above, as the SOC of the battery unit 4A increases while the battery unit 4A is being charged by the constant voltage charging method, the connection state of the battery unit 4A is switched in the order of the first state, the second state, and the third state. The impedance Zc of the secondary battery 10A is four times as large as the impedance of one battery module (when the connection state of the battery unit 4A is the first state), one time as large as the impedance of one battery module (when the connection state of the battery unit 4A is the second state), and one fourth as large as the impedance of one battery module (when the connection state of the battery unit 4A is the third state) in this order.

In this case, the maximum value Z2 of the impedance of the secondary battery 10A during the period from the start of the charging to the end of charging is smaller than the value Z3, and the range of change in the impedance Zc of the secondary battery 10A becomes narrower compared with the case where switching of the connection state of the battery unit 4A is not performed. Therefore, it is possible to reduce the maximum value and fluctuation of the impedance Zc of the secondary battery 10A during charging. As a result, reduction in charging efficiency can be suppressed.

In addition, the connection switching value Cth2 is larger than the connection switching value Cth1, and is an SOC in which the current command value Ic in a case where the connection state of the battery unit 4A is the third state is equal to or less than the value I0 of the charging current in the constant current charging method. Specifically, the connection switching value Cth2 is an SOC associated with the module charging current value Is which is equal to or less than one fourth the value I0 of the current in the characteristic table. For this reason, although a value which is four times as large as the module charging current value Is associated with the SOC in the characteristic table is transmitted to the charging device 2 as the current command value Ic in a case where the connection state of the battery unit 4A is the third state, since this current command value Ic is equal to or less than the value I0 of the charging current in the constant current charging method, there is no need to increase the maximum value (current capacity) of the value Ir of the charging current that can be supplied by the charging device 2. This makes it possible to receive a desired charging current without modifying the charging device 2.

In addition, the connection switching value Cth2 may be larger than the connection switching value Cth1, and may be an SOC in which the impedance Zc when the connection state of the battery unit 4A is switched from the second state to the third state falls within the range of the impedance Zc when the battery unit 4A is charged by the constant current charging method. For example, the connection switching value Cth2 may be an SOC in which the impedance Zc when the connection state of the battery unit 4A is switched from the second state to the third state is the impedance Zc (=Z0) when the SOC is 0%. In other words, the connection switching value Cth2 may be an SOC in which the impedance Zc immediately before the connection state of the battery unit 4A is switched from the second state to the third state is four times as large as the impedance Zc (=Z0) in a case where the SOC is 0%. In this case, it is possible to lengthen the period during which charging is performed in the range of the impedance Zc with high charging efficiency, and to improve the charging efficiency.

Although the embodiments of the present disclosure have been described above, the present invention is not limited to the above embodiments. For example, the battery controllers 52 and 52A transmit the current command value Ic to the charging device 2 so as to switch the constant current charging method and the constant voltage charging method to charge the battery units 4 and 4A according to the SOC of the battery units 4 and 4A, respectively. However, the charging method is not limited to this configuration. For example, in a case where the SOC of the battery units 4 and 4A is larger than or equal to the charge switching value Cc, the charging method need not be the constant voltage charging method. The charging method may be any charging method that reduces the value of the charging current supplied to each battery module as the SOC of the battery units 4 and 4A increases. In addition, the charging method in a case where the SOC of the battery units 4 and 4A is less than the charge switching value Cc need not be the constant current charging method. Another charging method may be used in which the value of the charging current supplied to each battery module is substantially constant. For example, a constant power charging method may be used instead of the constant current charging method. In the constant power charging method, since the change in voltage is moderate, the current (=power/voltage) is also substantially constant.

Further, the number of the battery modules included in the battery units 4 and 4A can be changed. In the first embodiment, the number of the battery modules included in the battery unit 4 is two. However, the number of the battery modules included in the battery unit 4 may be N×M (where N is an integer of 2 or more, and M is an integer of 1 or more). In this case, the switching unit 51 is configured to be capable of switching the connection state of the battery unit 4 between a first state in which all the battery modules are connected in series, and a second state in which N groups each including M battery modules connected in series are connected in parallel. Further, in a case where the connection state of the battery unit 4 is the first state, the battery controller 52 may transmit the module charging current value Is associated with the SOC of the battery unit 4 in the characteristic table as the current command value Ic to the charging device 2. When the connection state of the battery unit 4 is the second state, the battery controller 52 may transmit a value which is N times as large as the module charging current value Is associated with the SOC of the battery unit 4 in the characteristic table as the current command value Ic to the charging device 2.

In addition, in the second embodiment, the number of the battery modules included in the battery unit 4A is four. However, the number of the battery modules included in the battery unit 4A may be N×M (where N is an integer of 2 or more, and M is an integer of 1 or more), and M may be N1×M1 where N1 is an integer of 2 or more, and M1 is an integer of 1 or more. In this case, the switching unit 51A is configured to be capable of switching the connection state of the battery unit 4A between the first state in which all the battery modules are connected in series, the second state in which N groups each including M battery modules connected in series are connected in parallel, and the third state in which N×N1 groups each including M1 battery modules connected in series are connected in parallel. When the connection state of the battery unit 4A is the first state, the battery controller 52A may transmit the module charging current value Is associated with the SOC of the battery unit 4A in the characteristic table as the current command value Ic to the charging device 2. When the connection state of the battery unit 4A is the second state, the battery controller 52A may transmit a value which is N times as large as the module charging current value Is associated with the SOC of the battery unit 4A in the characteristic table as the current command value Ic to the charging device 2. When the connection state of the battery unit 4A is the third state, the battery controller 52A may transmit a value which is N×N1 times as large as the module charging current value Is associated with the SOC of the battery unit 4A in the characteristic table as the current command value Ic to the charging device 2.

Further, the connection state of the battery units 4 and 4A may be switched in the following procedure. First, the command value calculation units 23 and 23A transmit a command to the charging device 2 so as to temporarily stop charging the battery units 4 and 4A (for example, forcibly set the current command value Ic to zero), respectively. Then, the switching determination units 22 and 22A output the switching signal to the switching units 51 and 51A in order to switch the connection state of the battery units 4 and 4A, respectively. Then, the command value calculation units 23 and 23A transmit a command to the charging device 2 so as to restart the charging of the battery units 4 and 4A (the current command value Ic calculated by the command value calculation units 23 and 23A is transmitted without applying modifications thereto), respectively. In the switching of the connection state of the battery units 4 and 4A, no current flows in the switching units 51 and 51A during switching of the connection state, so that rapid changes in the output voltage and the output current of the charging device 2 with the switching of the connection state can be avoided.

The SOC of the battery module may be a value serving as a standard for determining the current command value Ic suitable for the battery module in consideration of the usage history of the battery module and the temperature of the battery module.

In the above embodiment, during discharging the battery units 4 and 4A, the switching determination units 22 and 22A output the switching signal to the switching units 51 and 51A so that the connection state of the battery units 4 and 4A is set to the first state, respectively. However, the present invention is not limited to this embodiment. The switching determination unit 22 may output the switching signal to the switching unit 51 so that the connection state of the battery unit 4 is set to the second state according to the voltage value required by the load device 3. The switching determination unit 22A may output the switching signal to the switching unit 51A so that the connection state of the battery unit 4A is set to the second state or the third state according to the voltage value required by the load device 3.

Further, in the above embodiment, in a case where the connection state of the battery units 4 and 4A is the second state or the third state, the current command value Ic is set to a value that is twice or four times as large as the module charging current value Is. However, the present invention is not limited to this embodiment. For merely suppression of the fluctuation in the impedance Zc of the secondary batteries 10 and 10A in a case where the connection state of the battery units 4 and 4A is the second state or the third state, for example, the current command value Ic may be set to the module charging current value Is (that is, one time as large as the module charging current value Is) that is associated with the SOC in the characteristic table.

The current command value Ic transmitted by the battery controllers 52 and 52A to the charging device 2, and the value Ir of the charging current supplied to the secondary batteries 10 and 10A by the charging device 2 is generally coincident, respectively. However, for example, in a case where the charging device 2 is a wireless power transfer device, the misalignment between the power transmission coil and the power reception coil is large, or the like, so that the value Ir of the charging current that the charging device 2 can supply to the secondary batteries 10 and 10A may become smaller than the current command value Ic. In such a case, the impedance of the secondary batteries 10 and 10A may exceed the upper limit of the impedance that can be output from the charging device 2. Therefore, the charging device 2 may transmit a switching command for changing the impedance of the secondary batteries 10 and 10A to the battery controllers 52 and 52A.

Figure 10:
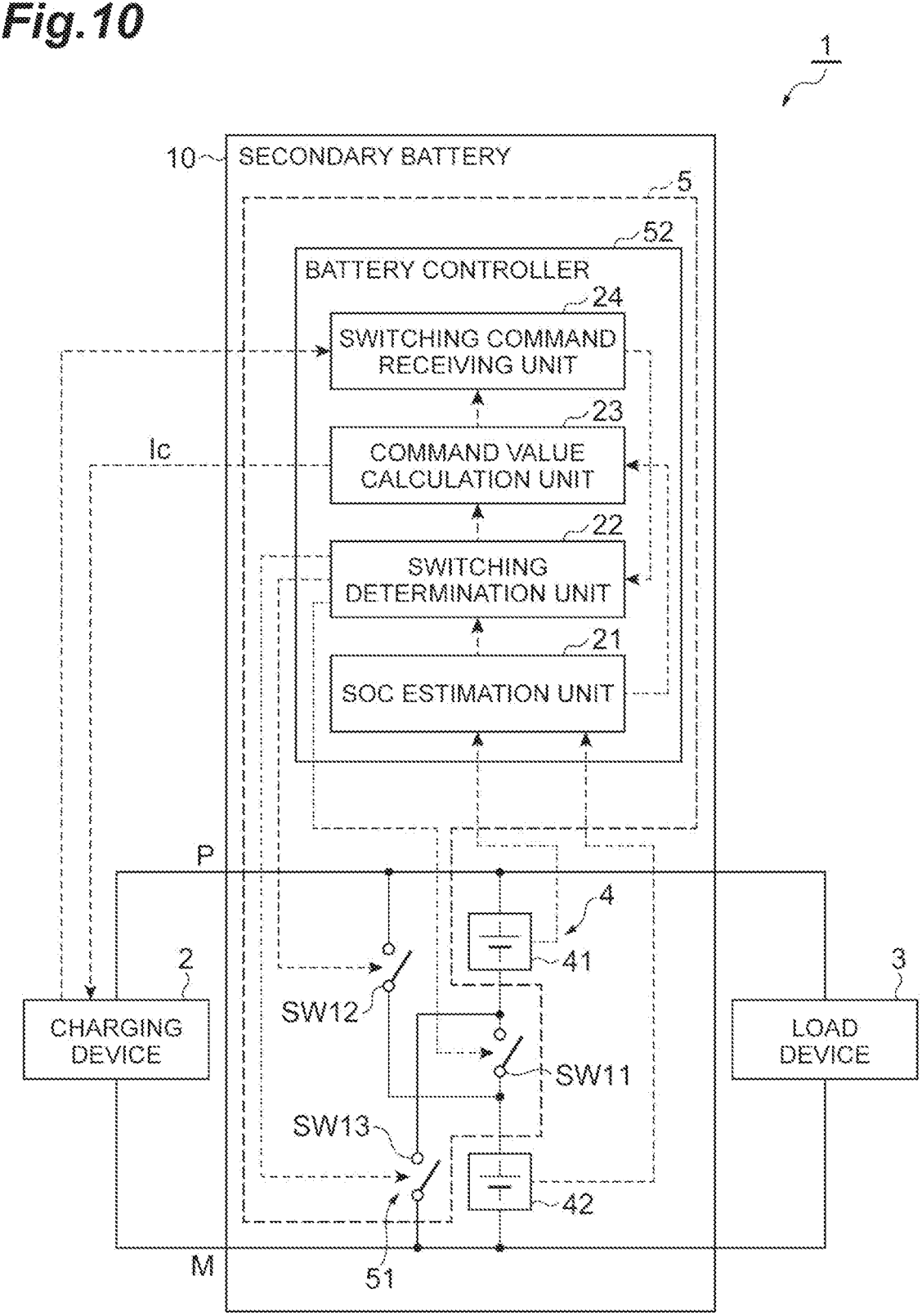
FIG. 10 is a diagram showing a schematic configuration of a modification of the power feeding system including the charging control device of FIG. 1.

FIG. 10 is a diagram showing a schematic configuration of a modification of the power feeding system 1 including the charging control device 5 of FIG. 1. As shown in FIG. 10, the battery controller 52 further includes a switching command receiving unit 24. The switching command receiving unit 24 functions as a switching command receiving means that receives a switching command transmitted from the charging device 2. The switching command includes a switching command for reducing the impedance of the secondary battery 10 and a switching command for returning the impedance of the secondary battery 10 to the original. The switching command receiving unit 24 outputs the received switching command to the switching determination unit 22.

When the connection state of the battery unit 4 is the first state, the switching determination unit 22 switches the connection state of the battery unit 4 from the first state to the second state in response to receiving the switching command from the charging device 2. Specifically, upon receiving a switching command to lower the impedance of the secondary battery 10 from the switching command receiving unit 24, the switching determination unit 22 determines whether the connection state of the battery unit 4 is the first state or the second state. When the connection state of the battery unit 4 is the first state, the switching determination unit 22 outputs the switching signal to the switching unit 51 so as to switch the connection state of the battery unit 4 to the second state. When the connection state of the battery unit 4 is the second state, the switching determination unit 22 does not switch the connection state of the battery unit 4.

Upon receiving a switching command to return the impedance of the secondary battery 10 to the original, the switching determination unit 22 determines whether or not the connection state of the battery unit 4 is switched by a switching command to lower the impedance of the secondary battery 10. When the connection state of the battery unit 4 is switched by the switching command, the switching determination unit 22 outputs the switching signal to the switching unit 51 so as to switch the connection state of the battery unit 4 from the second state to the first state. When the connection state of the battery unit 4 is not switched by the switching command, the switching determination unit 22 does not switch the connection state of the battery unit 4. The switching determination unit 22 includes, for example, a flag indicating that the connection state of the battery unit 4 has been switched by the switching command.

Even the modifications of the power feeding system 1 and the charging control device 5 have the same effects as the power feeding system 1 and the charging control device 5. As shown in FIGS. 11(a) and 11(b), in the modifications of the power feeding system 1 and the charging control device 5, in a case where the value Ir of the charging current that the charging device 2 can supply becomes smaller than the current command value Ic for some reason, the charging device 2 transmits a switching command for lowering the impedance Zc of the secondary battery 10 to the charging control device 5 Thereby, the connection state of the battery unit 4 is switched from the first state to the second state. As a result, it possible to reduce the impedance Zc of the secondary battery 10, and to suppress the impedance Zc of the secondary battery 10 from exceeding the upper limit of the impedance that can be output by the charging device 2. That is, when the connection state of the battery unit 4 remains in the first state, the impedance Zc becomes Ic/Ir times the impedance Zc in a case where the current command value Ic is equal to the value Ir of the current. On the other hand, when the connection state of the battery unit 4 is switched to the second state, the impedance Zc is, for example, reduced to Ic/(4×Ir) times the impedance Zc in a case where the current command value Ic is equal to the value Ir of the current.

The charging device 2 may provide notification of the value Ir of the charging current that can be supplied to the secondary battery 10, instead of providing notification of the switching command. In this case, the battery controller 52 may calculate the voltage value Vc/value Ir of the current instead of the voltage value Vc/current command value Ic, may set it as the value of the impedance Zc, and may switch the connection state of the battery unit 4 according to the impedance Zc.

In the power feeding system 1A, a configuration similar to that of the variation of the power feeding system 1 can be used.

REFERENCE SIGNS LIST 1, 1A power feeding system
2 charging device
3 load device
4, 4A battery unit
5, 5A charging control device
10, 10A secondary battery
21 SOC estimation unit
22, 22A switching determination unit
23, 23A command value calculation unit
24 switching command receiving unit
41, 42, 43, 44 battery module
51, 51A switching unit
52, 52A battery controller (control unit)
Cc charge switching value
Cth1 connection switching value (first connection switching value)
Cth2 connection switching value (second connection switching value)
G1 group
G2 group
M negative electrode terminal
P positive electrode terminal,
SW11, SW12, SW13, SW21, SW22, SW23, SW31, SW32, SW33 switch

The invention claimed is:

1. A charging control device comprising:
a switching unit configured to be capable of switching a connection state of a battery unit including a plurality of battery modules whose number is N×M (where N is an integer of 2 or more, and M is an integer of 1 or more); and
a controller configured to control the switching unit so as to cause the switching unit to switch the connection state based on a power storage amount of the battery unit, wherein
the M is N1×M1 where N1 is an integer of 2 or more, and M1 is an integer of 1 or more,
the switching unit is configured to be capable of switching the connection state between a first state in which all the battery modules are connected in series, a second state in which N first groups each including M battery modules connected in series are connected in parallel, and a third state in which N×N1 second groups each including M1 battery modules connected in series are connected in parallel,
the controller causes the switching unit to switch the connection state from the first state to the second state when the power storage amount becomes equal to or larger than a first connection switching value in a first charging method in which a current supplied to each of the plurality of battery modules decreases as the power storage amount increases,
the controller causes the switching unit to switch the connection state from the second state to the third state in response to the power storage amount becoming equal to or larger than a second connection switching value which is larger than the first connection switching value in a case where the battery unit is charged by the first charging method,
the first charging method is a constant voltage charging method in which a voltage value of a charging voltage of each of the plurality of battery modules is made constant.

2. The charging control device according to claim 1, wherein the controller transmits a current command value instructing a value of a charging current supplied to the battery unit to a charging device that supplies the charging current based on the power storage amount and the connection state.

3. The charging control device according to claim 2, wherein
the controller includes a characteristic table in which the power storage amount is associated with a module charging current value which is a value of a current to be supplied to one battery module, and
the controller transmits the module charging current value associated with the power storage amount as the current command value to the charging device in a case where the connection state is the first state, and the controller transmits a value that is N times as large as the module charging current value associated with the power storage amount as the current command value to the charging device in a case where the connection state is the second state.

4. The charging control device according to claim 2, wherein the controller transmits the current command value to the charging device so as to charge the battery unit by a second charging method in which a value of a current supplied to each of the plurality of battery modules is made constant in a case where the power storage amount is smaller than a charge switching value, and the controller transmits the current command value to the charging device so as to charge the battery unit by the first charging method in a case where the power storage amount is equal to or larger than the charge switching value.

5. The charging control device according to claim 4, wherein the first connection switching value is a power storage amount in which the current command value in the second state is equal to or less than the value of the charging current in the second charging method.

6. The charging control device according to claim 4, wherein the first connection switching value is a power storage amount in which an impedance of the battery unit when the connection state is switched from the first state to the second state falls within a range of an impedance of the battery unit when charging the battery unit by the second charging method.

7. The charging control device according to claim 4, wherein the second charging method is a constant current charging method in which the value of the charging current supplied to each of the plurality of battery modules is made constant.

8. The charging control device according to claim 2, wherein the controller causes the switching unit to switch the connection state from the first state to the second state in response to receiving a switching command for lowering an impedance of the battery unit from the charging device in a case where the connection state is the first state.

9. The charging control device according to claim 1, wherein a voltage value of a voltage between a positive electrode terminal and a negative electrode terminal of the battery unit is constant in a case where the battery unit is charged by the first charging method.

10. The charging control device according to claim 1, wherein the switching unit switches the connection state from the second state to the third state by dividing each of the N first groups into N1 second groups.

11. The charging control device according to claim 1, wherein in the constant voltage charging method, each of the plurality of battery modules is charged in a state in which the voltage value of the charging voltage of each of the plurality of battery modules is kept constant.

12. A charging control device comprising:
a switching unit configured to be capable of switching a connection state of a battery unit including a plurality of battery modules whose number is N×M (where N is an integer of 2 or more, and M is an integer of 1 or more); and
a controller configured to control the switching unit so as to cause the switching unit to switch the connection state based on a power storage amount of the battery unit, wherein
the switching unit is configured to be capable of switching the connection state between a first state in which all the battery modules are connected in series, and a second state in which N groups each including M battery modules connected in series are connected in parallel,
the controller causes the switching unit to switch the connection state from the first state to the second state when the power storage amount becomes equal to or larger than a first connection switching value in a first charging method in which a current supplied to each of the plurality of battery modules decreases as the power storage amount increases, and
the first charging method is a constant voltage charging method in which a voltage value of a charging voltage of each of the plurality of battery modules is made constant,
the controller transmits a current command value instructing a value of a charging current supplied to the battery unit to a charging device that supplies the charging current based on the power storage amount and the connection state, and
the controller causes the switching unit to switch the connection state from the first state, regardless of the power storage amount, to the second state in response to receiving a switching command for lowering an impedance of the battery unit from the charging device in a case where the connection state is the first state.

13. A charging control device comprising:
a switching unit configured to be capable of switching a connection state of a battery unit including a plurality of battery modules whose number is N×M (where N is an integer of 2 or more, and M is an integer of 1 or more); and
a controller configured to control the switching unit so as to cause the switching unit to switch the connection state based on a power storage amount of the battery unit, wherein
the switching unit is configured to be capable of switching the connection state between a first state in which all the battery modules are connected in series, and a second state in which N groups each including M battery modules connected in series are connected in parallel,
the controller causes the switching unit to switch the connection state from the first state to the second state when the power storage amount becomes equal to or larger than a first connection switching value in a first charging method in which a current supplied to each of the plurality of battery modules decreases as the power storage amount increases,
the first charging method is a constant voltage charging method in which a voltage value of a charging voltage of each of the plurality of battery modules is made constant,
the controller transmits a current command value instructing a value of a charging current supplied to the battery unit to a charging device that supplies the charging current based on the power storage amount and the connection state,
the controller includes a characteristic table in which the power storage amount is associated with a module charging current value which is a value of a current to be supplied to one battery module, and
the controller transmits the module charging current value associated with the power storage amount as the current command value to the charging device in a case where the connection state is the first state, and the controller transmits a value that is N times as large as the module charging current value associated with the power storage amount as the current command value to the charging device in a case where the connection state is the second state.

* * * * *